(12) United States Patent
Bader

(10) Patent No.: US 10,577,257 B1
(45) Date of Patent: *Mar. 3, 2020

(54) DE-SCALING: THE WAY TO ECONOMICAL DESALINATION

(71) Applicant: Mansour S. Bader, College Station, TX (US)

(72) Inventor: Mansour S. Bader, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/501,595

(22) Filed: May 6, 2019

Related U.S. Application Data

(63) Continuation-in-part of application No. 14/998,774, filed on Feb. 13, 2016, now Pat. No. 10,280,103, which is a continuation-in-part of application No. 14/544,436, filed on Jan. 6, 2015, now Pat. No. 10,259,735, and a continuation-in-part of application No. 14/544,317, filed on Dec. 22, 2014, now Pat. No. 10,259,734, which is a continuation-in-part of (Continued)

(51) Int. Cl.
| | |
|---|---|
| *C02F 9/00* | (2006.01) |
| *C02F 1/04* | (2006.01) |
| *C02F 1/06* | (2006.01) |
| *C02F 5/12* | (2006.01) |
| *C02F 101/10* | (2006.01) |
| *C02F 103/08* | (2006.01) |

(52) U.S. Cl.
CPC .............. *C02F 1/042* (2013.01); *C02F 1/043* (2013.01); *C02F 1/06* (2013.01); *C02F 5/12* (2013.01); *C02F 2101/101* (2013.01); *C02F 2103/08* (2013.01); *C02F 2301/08* (2013.01); *C02F 2303/18* (2013.01); *C02F 2303/22* (2013.01)

(58) Field of Classification Search
USPC ......... 203/10, 21, 85–88, DIG. 17; 210/633, 210/639–642
See application file for complete search history.

(56) References Cited

U.S. PATENT DOCUMENTS 5,102,550 A * 4/1992 Pizzino ................ B01D 61/364
210/640
5,592,690 A * 1/1997 Wu ........................ A41B 11/00
2/67

(Continued)

*Primary Examiner* — Nina Bhat

(57) ABSTRACT

A method and system for effectively desalinating a feed stream is provided. In one embodiment, a feed stream is desalinated by a Brine Forward (BF) desalination system, which comprises an enabling de-scaling step combined with a plurality of multi-stage flash (MSF) trains arranged in series, wherein the de-scaling step is conducted within a MSF first train at a top temperature. With the aid of the de-scaling step, the system obviates or reduces many of the well known disadvantages of the desalination practice along with their expenditures and environmental burdens. The elimination of otherwise intractable substantial operating and silent environmental costs of such disadvantages, in itself, may over defray the de-scaling step's cost and with greater benefits to the overall system's performance and distillate production. Furthermore, all of the products from the de-scaling step are commercially viable, and if desirable or necessary, all of the de-scaling step's additives are also recyclable.

20 Claims, 8 Drawing Sheets

Related U.S. Application Data application No. 13/066,841, filed on Apr. 26, 2011, now Pat. No. 8,915,301.

(56) References Cited

U.S. PATENT DOCUMENTS

| | | | |
|---|---|---|---|
| 6,905,604 B2 * | 6/2005 | Taber | B01D 61/025 |
| | | | 210/652 |
| 8,915,301 B1 * | 12/2014 | Bader | C02F 9/00 |
| | | | 166/371 |
| 9,701,558 B1 * | 7/2017 | Bader | C02F 9/00 |
| 9,751,047 B2 * | 9/2017 | Lienhard | B01D 69/02 |
| 9,784,489 B2 * | 10/2017 | Ma | E03B 3/28 |
| 10,258,920 B1 | 4/2019 | Bader | |
| 10,259,734 B1 * | 4/2019 | Bader | C02F 9/00 |
| 10,259,735 B1 * | 4/2019 | Bader | C02F 1/06 |
| 10,280,103 B1 * | 5/2019 | Bader | C02F 9/00 |
| 10,322,952 B1 * | 6/2019 | Bader | C02F 1/447 |
| 10,336,638 B1 * | 7/2019 | Bader | C02F 9/00 |
| 2016/0244349 A1 * | 8/2016 | St. John | C02F 9/00 |

* cited by examiner

DE-SCALING: THE WAY TO ECONOMICAL DESALINATION

RELATED APPLICATIONS

This application is a continuation-in-part of my patent application Ser. No. 14/998,774 filed on Feb. 13, 2016, now U.S. Pat. No. 10,280,103; which is a continuation-in-part of my patent application Ser. No. 14/544,436 filed on Jan. 6, 2015, now U.S. Pat. No. 10,259,735; which is a continuation-in-part of my patent application Ser. No. 14/544,317 filed on Dec. 22, 2014, now U.S. Pat. No. 10,259,734; which is a continuation-in-part of my patent application Ser. No. 13/066,841 filed on Apr. 26, 2011, now U.S. Pat. No. 8,915,301.

This application is also related to my patent application Ser. No. 16/501,510 filed on Apr. 16, 2019; which is a continuation-in-part of my allowed patent application Ser. No. 15/731,999 filed on Sep. 7, 2017; which is a continuation-in-part of my allowed patent application Ser. No. 15/731,626 filed on Jul. 10, 2017; which is a continuation-in-part of my patent application Ser. No. 13/999,309 filed on Feb. 8, 2014, now U.S. Pat. No. 9,701,558.

BRIEF BACKGROUND OF THE INVENTION

In seawater thermal desalination such as multi-stage flash (MSF), multi-effect (ME) and the like, only about one gallon of distillate may be actually recovered from ten gallons of a total seawater feed stream. The primarily reason for at least this wasteful usage and pumping of seawater is scale forming compounds. The scale is essentially a mixture of magnesium hydroxide, calcium carbonate, and the hydrates of calcium sulfate (gypsum, anhydrite, and hemihydrate). Magnesium hydroxide and calcium carbonate are alkaline compounds, which are formed as a result of the release of carbon dioxide from seawater. The scale formation of the hydrates of calcium sulfate is controlled by their limited aqueous solubilities, wherein the solubilities of anhydrite and hemihydrate plummet with increasing temperatures. The theme of operating thermal desalination methods is essentially based on pre-heating and de-aerating a water source to partially control alkaline scale, dosing a scale inhibitor, and restricting the top brine temperature (e.g., 65-110° C.) and brine concentration factor (e.g., 1.2-1.6) to mainly avoid conditions under which the solubility limits calcium sulfate hydrates are exceeded.

The point is clear; the dilemma in the desalination field, as disclosed in my patent application Ser. No. 16/501,510 and summarized in FIG. 1, is fully pronounced in disadvantageously operating multiple independent MSF trains in a desalination plant (system) as well as multiple independent MED trains in a desalination plant. The dilemma may also extend to disadvantageously impractical combining of MED-MED concept in an independent train, or combining MSF-MED concepts in an independent train.

As used herein, the convenient practice throughout the entire history of the desalination field is that a desalination plant comprises a plurality of independent trains, wherein each train is operated independently by having its own steam supply, a seawater feed stream, a distillate stream, a reject brine stream, a reject cooling seawater stream, a heat rejection section or a heat rejection condenser, and a re-circulated (recycle) brine stream within each independent train[e.g., when applicable as in a recycle brine MSF (RB-MSF) train in a desalination plant]. For example, if a conventional desalination plant comprised eight RB-MSF trains, then each of the trains in the plant would be operated independently.

The dilemma as summarized in FIG. 1, wherein its ascendancy rests squarely on alkaline and sulfate scale issues, is that by ignoring these scale issues, the solution of one problem has, in turn, created several new ones. By preconceiving the illusion of the "impossible" (scale issues are not solvable), the desalination field has been dramatically limiting the "possible" (scale issues are inevitable, wherein they are tolerable within a pre-set limit, thereby solvable only within desalination methods themselves), all solutions begin and end in a locked in circle within this perceived "possible"; thereby failing to see the distorted perception of the "impossible". When the preconceived "impossible" and perceived "possible" are bordered, however improbable, the perceived "possible" becomes the specialized thinking, whereby it becomes more difficult to deviate from it, nor to generate creative ideas within it, nor even obvious ones. However, scale issues can neither be solved by desalination methods alone, nor desalination methods can be a fortiori pretend to scale issues, nor the desalination field can hold indefinitely the same operating theme as contrived in the 1950s.

THE OBJECTIVES OF THE INVENTION

As such, the objectives of this invention are to provide effective desalination methods and systems, with the aid of inventive de-scaling methods, wherein such methods and systems are aimed at solving the critical issues in seawater thermal desalination by: (1) eliminating the use of scale inhibitors, thereby lifting the imposed restriction on top brine temperatures; (2) eliminating recycle brine, thereby requiring much less pumping power and less cooling seawater; (3) producing more distillate while reducing steam consumption as well as reject brine; (4) producing de-scaled reject brine to be readily utilized in other applications; (5) eliminating reject cooling seawater, thereby reducing seawater usage and pumping power requirements; (6) improving de-gassing, thereby rigorous venting and lessening medium pressure (M.P.) steam requirements for ejectors; and (7) protecting the marine environment and marine inhabitants.

SUMMARY OF THE INVENTION

In one particular embodiment of this invention, a method for desalinating a feed stream of a water source to produce a distillate stream and a reject brine stream; wherein the method comprising a Brine Forward (BF) desalination system, and wherein the BF desalination system comprises a plurality of MSF trains arranges in series. Each MSF train comprises a heat gain section and a brine heater, except the MSF first train and the MSF last train. The MSF first train comprises a heat gain section, a modified flash stage, and a brine heater. The modified flash stage serves as a de-scaling stage at the top temperature of the MSF first train. The MSF last train comprises a heat rejection section, a heat gain section, and a brine heater. Each MSF train in the BF desalination system produces a distillate stream and a brine stream. A water source, such as seawater and the like, is pre-heated in the heat rejection section of the MSF last train, and de-aerated to produce a feed stream. The feed stream flows, in series, through inner tubes of a set of pre-heaters in the heat gain section and the modified flash stage, and it then flows through the brine heater of the MSF first train to gain further heat. The feed stream at the exit of the brine heater is mixed with aluminum hydroxide or iron hydroxide, and then it is released in the modified flash stage to be contacted with an organic hydroxide source, wherein the organic hydroxide source is sprayed via nozzles into the modified flash stage, thereby vigorously forming precipitates comprising magnesium sulfoaluminate (upon mixing with aluminum hydroxide) or magnesium sulfoferrate (upon mixing with iron hydroxide), and simultaneously vigorously recovering the organic hydroxide source. The recovered organic hydroxide source is recycled to the modified flash stage, and the formed precipitates are removed from the modified flash stage to produce a de-scaled feed stream. The de-scaled feed stream flows downstream to the heat gain section of the MSF first train to produce a distillate stream and a brine stream. After that, the brine stream from each of the MSF trains, except the MSF last train, passes as an input feed stream to the next succeeding MSF train, thereby producing an outlet brine stream having a progressively higher level of total dissolved solids (TDS) than a preceding train. The brine stream from the MSF last train of the BF desalination system is discharged having a TDS level not exceeding 250,000 mg/L of said TDS.

In another particular embodiment, a method for desalinating a feed stream of a water source to produce a distillate stream and a reject brine stream; wherein the method comprising a Mixed Brine Forward (MBF) desalination system, wherein the MBF desalination system comprises a plurality of MSF trains arranges in series. Each MSF train comprises a heat gain section and a brine heater, except the MSF first train and the MSF last train. The MSF first train comprises a heat gain section, a modified flash stage, and a brine heater. The MSF last train comprises a heat rejection section, a heat gain section, and a brine heater. Each MSF train in the BF desalination system produces a distillate stream and a brine stream. A water source, such as seawater and the like, is pre-heated in the heat rejection section of the MSF last train, and de-aerated to produce a feed stream. The feed stream is mixed with at least a portion of the brine stream from the MSF last train to produce a mixed feed stream. The mixed feed stream flows, in series, through inner tubes of a set of pre-heaters in the heat gain section and the modified flash stage, and it then flows through the brine heater of the MSF first train to gain further heat. The mixed feed stream at the exit of the brine heater is mixed with aluminum hydroxide or iron hydroxide, and then is released in the modified flash stage to be contacted with an organic hydroxide source, and wherein the organic hydroxide source is sprayed via nozzles into the modified flash stage, thereby vigorously forming precipitates comprising magnesium sulfoaluminate (upon mixing with aluminum hydroxide) or magnesium sulfoferrate (upon mixing with iron hydroxide), and simultaneously vigorously recovering the organic hydroxide source. The recovered organic hydroxide source is recycled to the modified flash stage, and the formed precipitates are removed from the modified flash stage to produce a de-scaled feed stream. The de-scaled feed stream flows downstream to the heat gain section of the MSF first train to produce a distillate stream and a brine stream. Thereinafter, the brine stream from each of the MSF trains, except the MSF last train, passes as an input feed stream to the next succeeding MSF train, thereby producing an outlet brine stream having a progressively higher level of total dissolved solids (TDS) than a preceding train. The brine stream from the MSF last train of the MBF desalination system is discharged having a TDS level not exceeding 250,000 mg/L of said TDS.

In a further particular embodiment, a method for desalinating a feed stream of a water source to produce a distillate stream and a reject brine stream; wherein the method comprising a Mixed Brine Forward (MBF) desalination system, wherein the MBF desalination system comprises a plurality of MSF trains arranges in series, in which each MSF train comprises a heat gain section and a brine heater, except a MSF first train and a MSF last train. The MSF last train comprises a heat rejection section, a heat gain section, and a brine heater. The MSF first train comprises a brine heater, two modified flash stages, and a heat gain section wherein the latter further comprises two separate sets of pre-heaters. The feed stream flows through inner tubes of a first set of pre-heaters in the heat gain section of the MSF first train. The feed stream at the exit of the heat gain section of the MSF first train is mixed with aluminum hydroxide or iron hydroxide, and then it is released in the first modified flash stage to be contacted with an organic hydroxide source, wherein the organic hydroxide source is sprayed via nozzles into the first modified flash stage, thereby simultaneously vigorously forming precipitates comprising magnesium sulfoaluminate (upon mixing with aluminum hydroxide) or magnesium sulfoferrate (upon mixing with iron hydroxide), and recovering the organic hydroxide source, wherein the recovered organic hydroxide source is recycled to the first modified flash stage, and the precipitates are removed from the first modified flash stage to produce a first de-scaled stream. At least a portion of the reject brine stream from the MSF last train flows, in series, through inner tubes of a second set of pre-heaters in the heat gain section of the MSF first train, in the first modified flash stage, and in a second modified flash stage, before it passes through the brine heater of the MSF first train to gain further heat, thereby producing a heated brine stream. The heated brine stream is released in the second modified flash stage to be flashed and mixed with the first de-scaled stream from the first modified flash stage, thereby producing a vapor stream containing trace amounts of the organic hydroxide source and producing a de-scaled feed stream. The vapor stream containing trace amounts of the organic hydroxide source is fed to the bottom of the first modified flash stage. The de-scaled feed stream flows downstream to the heat gain section of the MSF first train to produce a distillate stream and a brine stream. After that, the brine stream from each of the MSF trains, except the MSF last train, passes as an input feed stream to the next succeeding MSF train, thereby producing an outlet brine stream having a progressively higher level of total dissolved solids (TDS) than a preceding train. The brine stream from the MSF last train of the MBF desalination system is discharged having a TDS level not exceeding 250,000 mg/L of said TDS.

In a yet further particular embodiment, a vertically laid backward fed multi-effect (BME) train comprising a plurality of effects arranges in series, wherein a first effect is located at the bottom of the BME train and a last effect is located at the top of the BME train. A feed stream flows down to the last effect, through nozzles, and sprays on the outer surface of evaporating tubes in the last effect, wherein the last effect is operated at the lowest temperature and pressure. A brine stream from the last effect flows by gravity to the next subsequent effect through nozzles and sprays on the outer surface of evaporating tubes in the subsequent effect; thereinafter a brine stream flows in a similar manner to subsequent effects until the first effect, wherein the brine stream is discharged from the MBE train at a pre-selected temperature and total dissolved solids (TDS) level. The BME train is operated at successively higher pressure and temperature from the first effect to the last effect; wherein effects are operated in equal pressure increments from the last effect at the top of the MBE train to the first effect at the bottom of the MBE train to provide an equal thermodynamic driving force at all said effects. Due to pressure differentials, temperature differentials and higher vacuum in going up the effects, from the first effect to the last effect, vapor is transferred from a higher pressure and temperature effect to a subsequent lower pressure and temperature effect. As such, a vapor stream from the first effect is fed into evaporating tubes of a second effect, wherein the vapor stream gives up the latent heat to a brine stream being sprayed on the surface of the evaporating tubes in the second effect, thereby condensing the vapor stream from the first effect in the second effect, whereby the condensed vapor stream becomes a distillate stream of the second effect. Thereinafter, vapor flows in a similar manner to subsequent effects, until said last effect; wherein condensate from each effect flows under gravity from effect to effect, except the last effect; wherein a vapor stream from the last effect is condensed in a heat rejection condenser.

In a yet further particular embodiment, a method for desalinating a feed stream of a water source to produce a distillate stream and a reject brine stream, wherein the method comprising a Mixed Brine Forward (MBF) desalination system. The MBF desalination system further comprises a plurality of trains arranges in series, in which the trains alternate between a multi-flash stage (MSF) train and a backward fed multi-effect (BME) train. The lead train in the MBF desalination system is a MSF first train, and the backend train in the MBF desalination system is a BME last train. Each of the MSF trains comprises a heat gain section and a brine heater, except the MSF first train, wherein the MSF first train comprises a brine heater, two modified flash stages, and a heat gain section. Each of the BME trains comprises a heat rejection condenser. Each train in the MBF desalination system produces a distillate stream and a brine stream. A water source is pre-heated in each of the heat rejection condensers of the BME trains, and the combined pre-heated water source is de-aerated to produce a feed stream. The feed stream flows through inner tubes of a set of pre-heaters in the heat gain section of the MSF first train. The feed stream at the exit of the heat gain section of the MSF first train is mixed with aluminum hydroxide or iron hydroxide, and then it is released in a first modified flash stage to be contacted with an organic hydroxide source, wherein the organic hydroxide source is sprayed via nozzles into the first modified flash stage, thereby simultaneously vigorously forming precipitates comprising magnesium sulfoaluminate or magnesium sulfoferrate, and recovering the organic hydroxide source, wherein the recovered organic hydroxide source is recycled to the first modified flash stage, and precipitates are removed from the first modified flash stage to produce a first de-scaled stream. The brine stream from the BME last train passes through the brine heater of the MSF first train to gain further heat. The brine stream at the exit of the brine heater of the MSF first train is released in a second modified flash stage to be flashed and mixed with the first de-scaled stream from the first modified flash stage, thereby producing a vapor stream containing trace amounts of the organic hydroxide source, and producing a de-scaled feed stream. The vapor stream containing trace amounts of the organic hydroxide source is fed to the first modified flash stage. The de-scaled feed stream flows downstream to the heat gain section of the MSF first train to produce a distillate stream and a brine stream. Thereinafter, the brine stream from each of the MSF trains splits off and passes as input feed streams to the next succeeding BME and MSF trains, except the MSF last train, wherein a portion of the brine stream from the MSF last train passes as a feed input to the BME last train, and the remainder of the brine stream from the MSF last train is discharged from the MBF desalination system. The brine stream from each of the BME trains passes as an input feed stream to the next succeeding MSF train, except the BME last train, wherein the brine stream from the BME last train is fed to the brine heater of the MSF first train. In each of the successive MSF trains, after the MSF first train, each of heated feed streams at the exit of each of the heat gain sections of each of the MSF trains is at a temperature about the temperature of the brine stream from each of the preceding BME trains, wherein each of the heated feed streams is mixed with each of the brine streams from each of the preceding BME trains to form a mixed brine stream at the entry to each of the brine heaters of each of the MSF trains. Each of the mixed brine streams passes through each of the brine heaters, and flows downstream to each of the heat gain sections of each of the MSF trains, wherein each of these MSF trains produces a distillate stream and a brine stream.

It should be understood that the terminology used herein is for the purpose of description; thereby it should not be considered as limiting.

Further objects, novel features, and advantages of this invention will be apparent to those skilled in the art upon examining the accompanying drawings and upon reading the following description of the preferred embodiments, or may be learned by practice of the invention.

DESCRIPTION OF THE PREFERRED EMBODIMENT

The De-Scaling Concept

Figure 1:
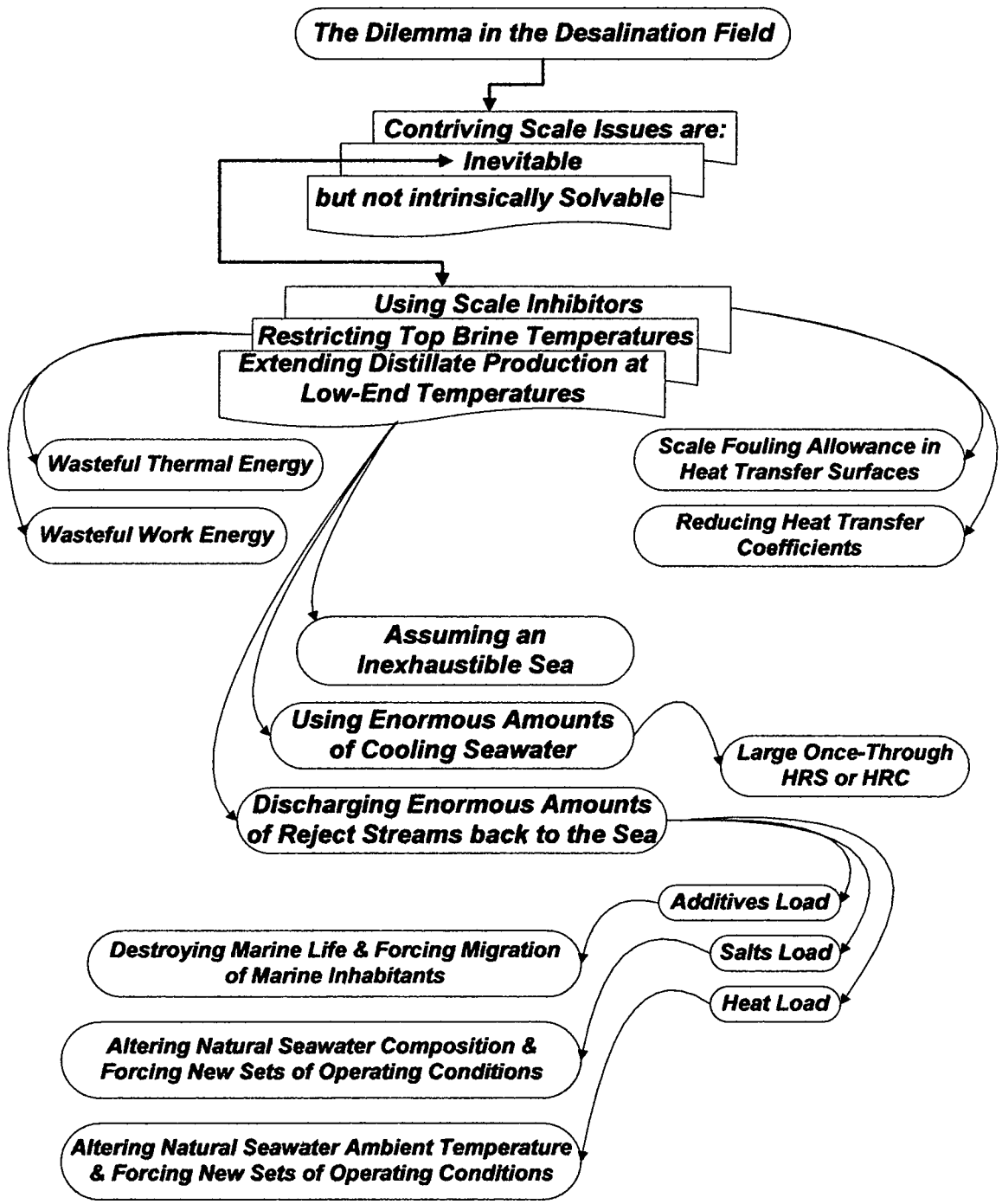
FIG. 1 illustrates the dilemma in the desalination field.

Table 1 indicates that the ratio of calcium to magnesium in a source of water (seawater) is about 0.2. On the other hand, the ratio of magnesium to sulfate is about 2. Since the magnesium concentration is about two-fold the sulfate concentration in such a source of water, magnesium would be a sufficient and appropriate precipitation sink for sulfate to be precipitated as a useful layered double hydroxides inorganic compound if it was supplemented with an appropriate trivalent cation and a hydroxide source. The structure of such a compound would then stem from the basic structure of magnesium hydroxide, which is the octahedral of magnesium (six-fold coordinated to hydroxyl groups) that share edges to form stacked layers held together by hydrogen bonding. When some of the magnesium is replaced by a trivalent cation with nearly an equivalent ionic radius (e.g., $Al^{+3}$ or $Fe^{+3}$), a net positive charge is permanently generated in the hydroxyl layers. This net positive charge is balanced by an interlayer of negatively charged anions that lies between the magnesium hydroxide-like layers. The free space of the interlayer is filled with water molecules. The structural features of such layered double hydroxides based-compound are thus dictated by the: (1) nature of the magnesium hydroxide-like layer; (2) identity of anions in the interlayer (e.g., sulfate, carbonate, hydroxyl, and chloride); and (3) manner of the magnesium hydroxide-like layers are stacked.

Calcium, as a relatively minor divalent cation in a source of water (e.g., Table 1), may be combined within the structure of the close packed configuration of the hydroxyl groups in the magnesium hydroxide-like layers. However, calcium has a larger ionic radius (0.98 Å) than magnesium (0.65 Å). In order to homogenously fit calcium within the octahedral structure of magnesium hydroxide-like layers, the ratio of calcium to magnesium in a source of water should be relatively low (e.g., about 0.2; Table 1).

The inventor has found that when a water source is mixed with a controlled amount of a nearly completely recoverable organic hydroxide source [isopropylamine (IPA), propylamine (PA), dipropylamine (DPA), diisopropylamine (DIPA), ethylamine (EA), diethylamine (DEA), methylamine (MA), dimethylamine (DMA), ammonia, and combinations thereof]), or a controlled amount of an inorganic double hydroxide source [dolime (MgO—CaO)], wherein dolime is a low cost additive with an added value in also recovering magnesium hydroxide from the dolime itself, the ratio of calcium to magnesium in the water source remains the same (about 0.2) upon mixing with the organic hydroxide source, and slightly increases but remains relatively low (about 0.28) upon mixing with the inorganic double hydroxide source (dolime).

The de-scaling of a source of water (e.g., Table 1) can thus be conducted in a single precipitation stage, wherein sulfate (along with the minor carbonate) is targeted for precipitation in the form of magnesium, upon the addition of a controlled amount of an organic hydroxide source, and an aluminum source (aluminum hydroxide) or an iron source (iron hydroxide). The precipitated layered double hydroxides based-compound would thus contain magnesium as the dominant divalent cation, and a trivalent cation (either aluminum or iron) in the outside layers, while their interlayer mainly contains essentially sulfate and water molecules. Within the outside layers, a fraction of the magnesium hydroxide sheets are substituted with either aluminum or iron, which provides permanent positive charge on the hydroxide layers. The positively charged hydroxide layers are counter-balanced by the negatively charged anions (e.g., sulfate, carbonate and hydroxyl) interlayers.

The inventor has found that if the organic hydroxide source was subjected to pressure and/or temperature manipulations in a compressed form, it would exhibit unusual thermo-physical properties, which are liquid-like density with higher diffusivity and compressibility but lower viscosity. When the organic hydroxide source is introduced in a water source at such conditions, the fast diffusion and low viscosity of the organic hydroxide source produces faster supersaturation of targeted ionic species; thereby controlling a precipitate's size, size distribution, morphology, and structure. This also minimizes the use of the organic hydroxide source, enhances the recovery of the organic hydroxide source, reduces the size of a precipitation unit, and drastically shortens the residence time in the precipitation unit.

Table 2 presents some of the relevant properties of the selected organic hydroxide sources. The energy required to thermally recover the organic hydroxide source from an aqueous mixture generally depends on the boiling point of the organic hydroxide source. The boiling point determines the number of degrees to which the mixture must be heated. The specific heat capacity determines the number of joules that must be introduced into the mixture to raise it each degree whereas the enthalpy (heat) of vaporization determines the number of additional joules needed to vaporize the organic hydroxide source. As shown in Table 2, such organic hydroxide sources generally exhibit low boiling points, low specific heat capacities, low enthalpies of vaporization, or combinations thereof; thereby fewer joules (less steam) required for their thermal recovery.

One the added values of this invention is that there are several commercial and industrial advantages for precipitating such layered double hydroxides inorganic compounds from a water source (e.g., Table 1). First, their interlayers are highly exchangeable. Second, their exchanged interlayers can be re-activated or re-substituted for reuse. Third, they are valuable precipitating additives since each compound, in itself, constitutes a complete source for a divalent cation (e.g., magnesium), a trivalent cation (aluminum or iron), and hydroxides.

The Brine Forward (BF) Desalination Concept

Except for accepting the acquiescence myth and its pregnant silences in the desalination field since the 1950s as summarized in FIG. 1, desalination of a water source such as seawater may be an effective way, both economically and environmentally, to solve the exponentially growing demands of potable water throughout the world. Contrary to this myth, the attraction of de-scaling a water source would be seen as a rational engineering approach to disarm scale formation in a desalination method at any combination of brine temperature and brine concentration. This would then allow a design freedom to further improve and optimize (arrangement, thermodynamic, structural, hydraulic, venting, etc.) a desalination system.

As such, what I have coined as a Brine-Forward (BF) desalination concept and a Mixed Brine-Forward (MBF) desalination concept, with an enabling de-scaling method, obviate so many disadvantages along with their expenditure and environmental burdens (as demonstrated in FIG. 1) in the desalination field. As a result of the inventive de-scaling method, the elimination, in itself, of otherwise unnecessary substantial operating costs and silent environmental costs of such disadvantages, may very well over defray the cost of the de-scaling method and with greater benefits to the performance ratio and distillate production. Furthermore, all of the products from the de-scaling method in this invention are commercially useful (magnesium sulfoaluminate or magnesium sulfoferrate), and all of the additives are recyclable in the de-scaling method (the organic hydroxide source, and if desired, the inorganic hydroxide source).

Figure 2:
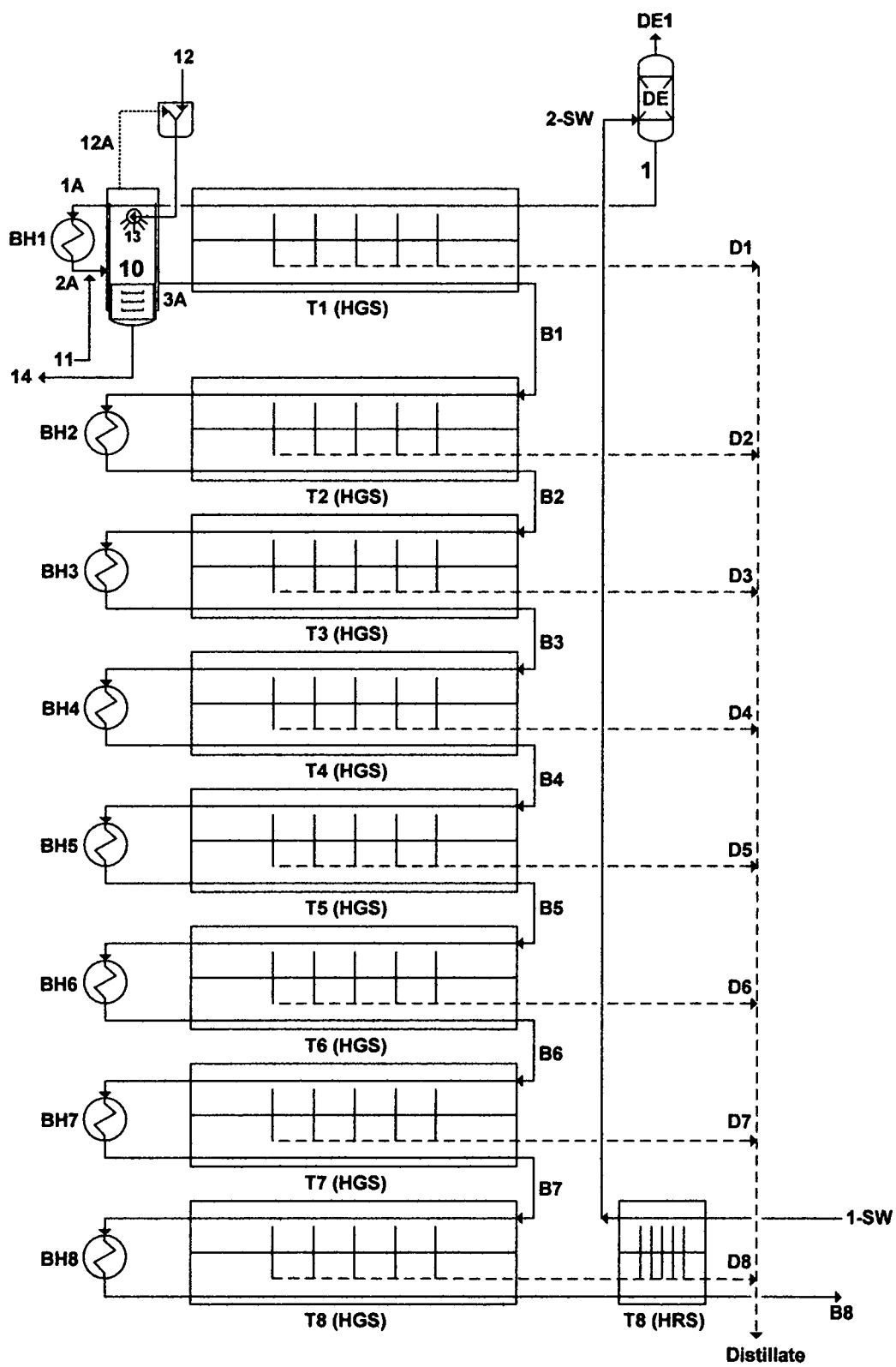
FIG. 2 illustrates a possible flow diagram for the inventive Brine Forward (BF) desalination system.

In one embodiment of this invention, FIG. 2 depicts the inventive BF desalination system, wherein the system comprises a plurality of MSF trains arranges in series. Each MSF train comprises a heat gain section and a brine heater, except the MSF first train and the MSF last train. The MSF first train comprises a heat gain section, a modified flash stage, and a brine heater. The modified flash stage serves as a de-scaling stage at the top temperature of the MSF first train. The MSF last train comprises a heat rejection section, a heat gain section, and a brine heater. Each MSF train in the BF desalination system produces a distillate stream and a brine stream. A water source [1-SW], such as seawater and the like, is pre-heated in the heat rejection section [HRS] of the MSF last train [T8], and de-aerated [DE] to produce a feed stream [1]. The feed stream [1] passes, in series, through the inner tubes of a set of pre-heaters in the heat gain section [HGS] and in the modified flash stage [10], and it [1A] then passes through the brine heater [BH1] of the MSF first train to gain further heat [2A]. The feed stream at the exit [2A] of the brine heater [BH1] is mixed with aluminum hydroxide or iron hydroxide [11], and then is released in the modified flash stage [10] to be contacted with an organic hydroxide source [12], wherein the organic hydroxide source [12] is sprayed via nozzles [13] into the modified flash stage [10], thereby vigorously forming precipitates comprising magnesium sulfoaluminate (upon mixing with aluminum hydroxide) or magnesium sulfoferrate (upon mixing with iron hydroxide), and simultaneously vigorously recovering the organic hydroxide source. The recovered organic hydroxide source [12A] is recycled to the modified flash stage [10], and the formed precipitates are removed [14] from the modified flash stage [10] to produce a de-scaled feed stream [3A]. The de-scaled feed stream [3A] flows downstream to the heat gain section [HGS] of the MSF first train [T1] to produce a distillate stream [D1] and a brine stream [B1]. After that, the brine stream from each of the MSF trains, except the MSF last train, passes as an input feed stream to the next succeeding MSF train, thereby producing an outlet brine stream having a progressively higher level of total dissolved solids (TDS) than a preceding train. The brine stream from the MSF last train of the BF desalination system is discharged having a TDS level not exceeding 250,000 mg/L of said TDS.

The organic hydroxide source in this invention is selected from the group consisting of isopropylamine, propylamine, dipropylamine, diisopropylamine, ethylamine, diethylamine, methylamine, dimethylamine, ammonia, and combinations thereof.

The precipitation of magnesium sulfoaluminate or magnesium sulfoferrate takes place based on the conditions under which it is effectively precipitated. Based on the inventor's findings; the removal of sulfate from a water source in the form of either magnesium sulfoaluminate or magnesium sulfoferrate, whether the water source is pre-heated or at ambient temperature, may be in the order of about 98%. One structural formula that may generally describe certain embodiments of magnesium sulfoaluminate or magnesium sulfoferrate, which also incorporates the minor divalent anion (carbonate), is as follows:

$$[Mg^{+2}]_A[SO_4^{-2}]_B[M^{+3}]_C[xH_2O]$$

where A is the stoichiometric amount of magnesium ($Mg^{+2}$), B is the stoichiometric amount of sulfate ($SO_4^{-2}$), C is the stoichiometric amount of the trivalent cation ($M^{+3}$; which is either aluminum: $Al^{+3}$ or iron: $Fe^{+3}$), and x is the hydration content. Depending on the amount of sulfate in the water source, the chemistry of the water source, and the basicity condition under which sulfate is precipitated in the form of either magnesium sulfoaluminate or magnesium sulfoferrate, the stoichiometric ratio (meq./L) of sulfate to magnesium (B/A) may be in the order of 0.1 to 0.6, the stoichiometric ratio (meq./L) of sulfate to the trivalent cation (B/C) may be in the order of 0.4 to 1.1, and the hydration content (x) may be in the order of 1.0 to 1.5.

The use, recovery and recycle of the organic hydroxide source, both free and fixed within the modified flash stage [10] is handled with great efficiency (>99% recovery) at minimal low cost (essentially adding the modified flash stage to the MSF first train). This is because the free organic hydroxide source is recovered by sparging with the vapor flashed (e.g., steam) from the brine, itself, in the modified flash stage [10], thereby an external steam source is not needed. The fixed organic hydroxide source, which is the organic hydroxide salts that may form during de-scaling (in other words, the organic hydroxide source in anionated forms), is converted to free organic hydroxide source by adding the inorganic hydroxide source [13], which is either aluminum hydroxide or iron hydroxide, and the resulting free organic hydroxide source is stripped from the brine by sparging with the vapor flashed from the brine, itself, in the modified flash stage. As such, a further innovative utility for the inorganic hydroxide source is converting the fixed organic hydroxide source, which may be formed during de-scaling, to free organic hydroxide source. The whole operation of using, recovering and recycling the organic hydroxide source is essentially carried out within the modified flash stage [10].

For recovering and recycling aluminum hydroxide (not shown in FIG. 2), if desired, acid (e.g., sulfuric acid) may be dosed to decompose the precipitates of magnesium sulfoaluminate [14], thereby precipitating aluminum hydroxide in high yield and producing essentially dissolved (soluble) magnesium sulfate from the decomposed magnesium sulfoaluminate [14]. The recovered aluminum hydroxide, along with a small make-up, may then be recycled for re-use within the modified flash stage. The same essentially goes for recovering and recycling iron hydroxide from the precipitates of magnesium sulfoferrate [14].

Figure 3:
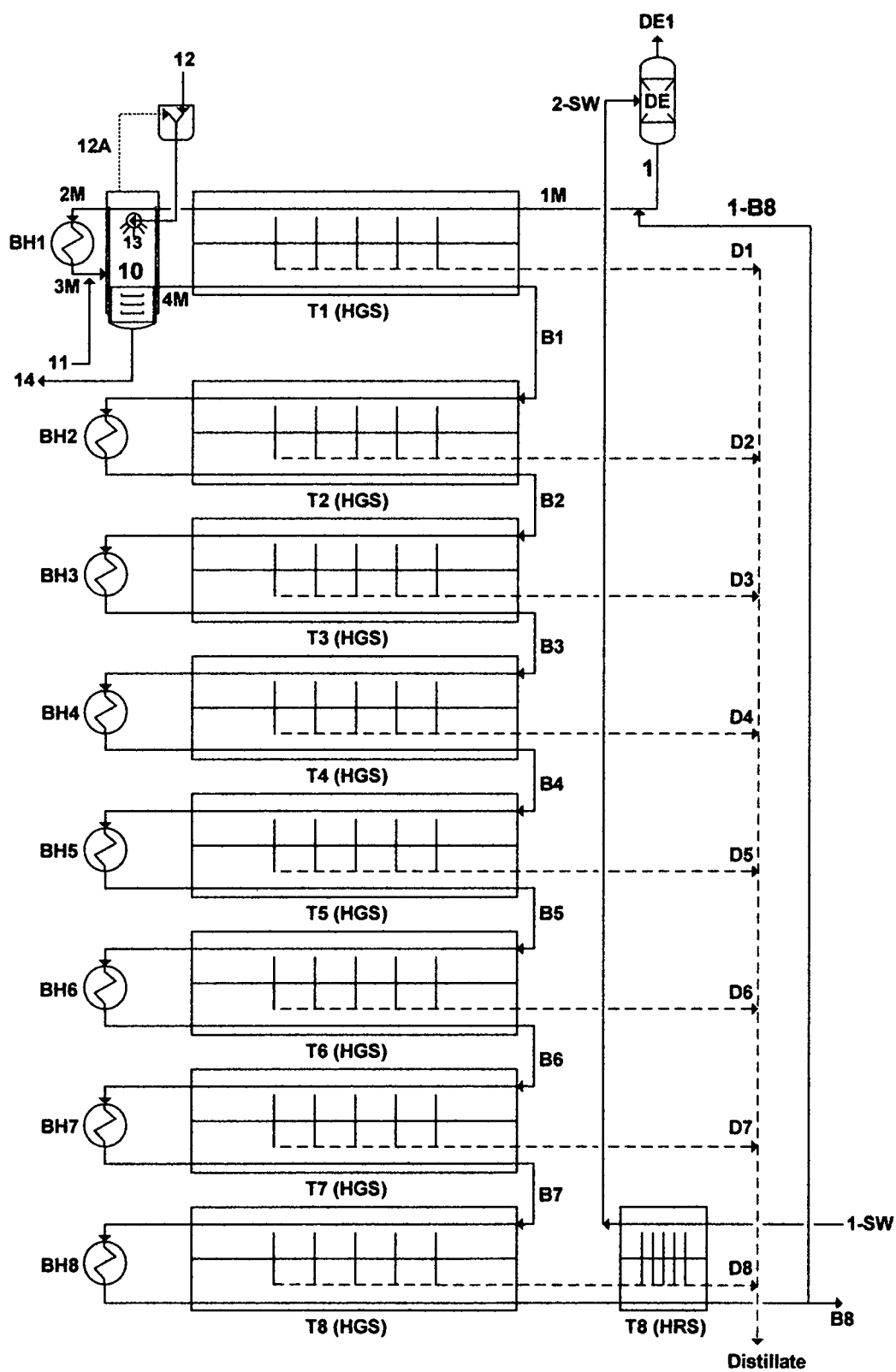
FIG. 3 illustrates a possible flow diagram for the inventive Mixed Brine Forward (MBF) desalination system.

In another embodiment as depicted in FIG. 3, the feed stream [1] is mixed with at least a portion [1-B8] of the brine stream [B8] from the MSF last train [T8] to produce a mixed feed stream [1M], and then a Mixed Brine Forward (MBF) desalination system is applied. However, a brine stream can also be diverted from any MSF train or from each of the MSF trains in the MBF desalination system, as desired or required, for mixing with the feed stream [1] to produce the mixed feed stream [1M]. The processing steps [2M, 3M, 4M, 10, 11, 12, 12A, 13, 14, D1-D8, and B1-B8] for the mixed feed stream [1M] in the MBF desalination system as shown in FIG. 3 are the similar to the processing steps [1A, 2A, 3A, 10, 11, 12, 12A, 13, 14, D1-D8, and B1-B8] of the feed stream [1] in the BF desalination system as shown in FIG. 2 and described hereinabove. The MBF desalination system has the advantage of reducing the content of scale prone species in the mixed feed stream since the reject brine stream is subsequently depleted of scale prone species, thereby reducing the required amounts of additives to de-scale the mixed feed stream in the modified flash stage [10]. Of equal importance, it has also the definite advantage of providing additional amounts of feed, thereby increasing the distillate output of each of the MSF trains in the MBF desalination system.

Figure 4:
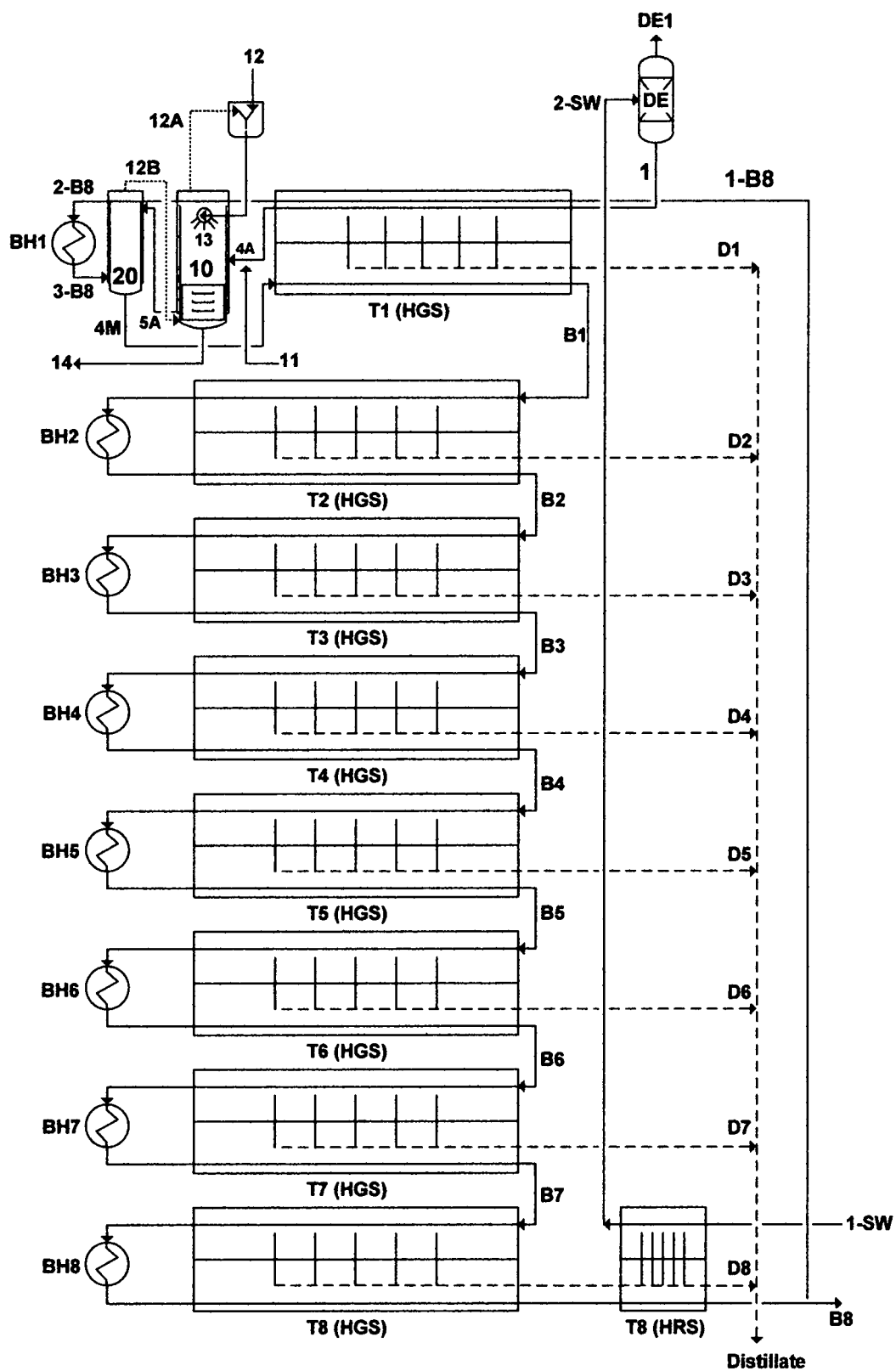
FIG. 4 illustrates another possible flow diagram for the inventive MBF desalination system.

A further embodiment of this invention is depicted in FIG. 4, which has the advantage of further stripping trace amounts of the organic hydroxide source from a first de-scaled stream before a de-scaled feed stream flows downstream to the heat gain section of the MSF first train. As shown in FIG. 4, the MBF desalination system comprises a plurality of MSF trains arranges in series, in which each MSF train comprises a heat gain section and a brine heater, except a MSF first train and a MSF last train. The MSF last train comprises a heat rejection section, a heat gain section, and a brine heater. The MSF first train comprises a brine heater, two modified flash stages, and a heat gain section wherein the latter further comprises two separate sets of pre-heaters. The feed stream [1] flows through inner tubes of a first set of pre-heaters in the heat gain section [HGS] of the MSF first train [T1]. The feed stream at the exit [4A] of the heat gain section of the MSF first train is mixed with aluminum hydroxide or iron hydroxide [11], and then it is released in the first modified flash stage [10] to be contacted with an organic hydroxide source [12], wherein the organic hydroxide source is sprayed via nozzles [13] into the first modified flash stage [10], thereby simultaneously vigorously forming precipitates comprising magnesium sulfoaluminate (upon mixing with aluminum hydroxide) or magnesium sulfoferrate (upon mixing with iron hydroxide), and recovering the organic hydroxide source [12A], wherein the recovered organic hydroxide source [12A] is recycled to the first modified flash stage [10], and the precipitates [14] are removed from the first modified flash stage to produce a first de-scaled stream [5A]. At least a portion [1-B8] of the reject brine stream [B8] from the MSF last train [T8] flows through inner tubes of a second set of pre-heaters, thereby passing, in series, through the heat gain section [HGS], the first modified flash stage [10], and a second modified flash stage [20], before it [2-B8] passes through the brine heater [BH1] of the MSF first train [T1] to gain further heat, thereby producing a heated brine stream [3-B8]. The heated brine stream [3-B8] is released in the second modified flash stage [20] to be flashed and mixed with the first de-scaled stream [5A] from the first modified flash stage [10], thereby producing a vapor stream containing trace amounts of the organic hydroxide source [12B] and producing a de-scaled feed stream [4M]. The vapor stream containing trace amounts of the organic hydroxide source [12B] is returned to the bottom of the first modified flash stage [10]. The de-scaled feed stream [4M] flows downstream to the heat gain section [HGS] of the MSF first train [T1] to produce a distillate stream [D1] and a brine stream [B1]. After that, the brine stream from each MSF train in the MBF desalination system, except the MSF last train, passes as an input feed stream to the next succeeding MSF train, thereby producing an outlet brine stream having a progressively higher level of total dissolved solids (TDS) than a preceding train. The brine stream [B8] from the MSF last train [T8] of the MBF desalination system is discharged having a TDS level not exceeding 250,000 mg/L of said TDS.

The modified flash stage ([10]) as shown in FIGS. 2 and 3, or the modified flash stages ([10] and [20]) as shown in FIG. 4, can be partitioned within the structural envelop of the heat gain section [HGS] of the MSF first train [T1].

It should be noted that the BF desalination system as shown in FIG. 2 or the MBF desalination system as shown in FIGS. 3 and 4 comprises eight MSF trains [T1 to T8] for the sole purpose of illustrating the embodiments of the invention. However, the number of the trains in such desalinations systems can be selected based on the desired distillate total sum of the BF desalination system or the MBF desalination system. Thus, the BF desalination system or the MBF desalination system may be limited to one train, two trains, or expanded to any desirable number of trains.

It should be also noted that dolime (not shown in FIGS. 2 through 4) may be added in a controlled stoichiometric amount, along with aluminum hydroxide or iron hydroxide [11], to balance the ratio of magnesium to sulfate and/or to dissociate the fixed organic hydroxide source from its associated anions in the modified flash stage [10] (FIGS. 2 and 3) or the first modified flash stage [10] (FIG. 4).

The heat rejection section [HRS] of the MSF last train [T8], as shown in FIGS. 2 through 4, may be eliminated, thereby the water source [1-SW] may be fed directly to the last flash stage of the heat gain section [HGS] of the MSF first train [T1].

Since reject brine [B8] from the MSF last train of the BF desalination system or the MBF desalination system is subsequently depleted of scale prone species [e.g., carbonate, bicarbonate, carbonic acid and carbon dioxide), sulfate, strontium, barium, radium, naturally occurring radioactive materials (NORM); radium's decay series, silica, transition metals, and combinations thereof] as well as oxygen, it may be used as a readily stream in applications such as, for example, hydrocarbons recovery (oil wells saline water injection operations), chlor-alkali industries, soda ash industries, and the like.

It should be noted that distillate from a desalination plant are generally conventionally re-mineralized, disinfected, de-gassed, and combinations thereof. Re-mineralization entails increasing the alkalinity and TDS in order stabilize the distillate by adding lime to distillate, blending distillate with some source water (brackish water or 1% seawater), or carbonating the distillate by carbon dioxide and lime. Disinfection is done by chlorine or alternatively by chloramines. The latter is a mixture of chlorine, and ammonia or amines (2 mg/L), and it is often preferred over free chlorine since it possesses a substantially slower decay rate than free chlorine. The importance of this advantage may be appreciated in large distillate storage and distribution systems, wherein higher temperatures and longer retention times are involved, whereby free chlorine under such conditions is highly prone for residual loss.

In this invention, however, the level of residuals free and entrained fixed organic hydroxide source in the distillate of the MSF first train in particular, and more specifically, of the first flash stage of the heat gain section of the MSF first train, may be in the order of 5-20 mg/L. For industrial uses, the distillate from the MSF first train would have a definite advantage, particularly as a boiler feed stream (e.g., in a power cycle of a power-desalination co-generation plant; refineries; once-through steam boilers and drum-type boilers in steam injection operations for heavy and sand oil recovery, etc.). For potable water uses, the distillate, particularly from the MSF first train, may be subjected to a further treatment by exchanging the residues of free and fixed organic hydroxide source in the distillate on a strong acid cation resin with an aqueous stream containing calcium hydroxide, thereby exchanging the residues of the free and fixed organic hydroxide source in the distillate with calcium. This would serve multiple purposes; providing the supplemental calcium cation to stabilize the distillate (typically practiced in conventional desalination plants), simultaneously reducing the residues of the free and fixed organic hydroxide source in the distillate to a level in the order of may be 1-5 µg/L, and producing chloramines upon disinfecting the distillate with chlorine (chlorine is typically practiced in conventional desalination plants). In other words, the use of a cation exchanger to polish the distillate, particularly from the MSF first train, by removing the residues of free and fixed organic hydroxide source complements the typical practice in conventional seawater desalination (distillate re-mineralization and disinfection). The exhausted cation resin is regenerated using acid (e.g., sulfuric acid or hydrochloric acid) to displace the organic hydroxide source from the resin. The regenerate stream containing the displaced organic hydroxide source from the resin can be recycled to the water source [1-SW], before the latter is pre-heated in the heat rejection section [HRS] of the MSF last train [T8] and then de-aerated [DE] to produce the feed stream [1] (FIGS. 2 through 4).

The water source is selected from the group consisting of seawater, reject cooling water stream, a reject brine stream from a desalination method, brackish water, produced water, fracturing water, a spent stream from flue gas de-sulfurization, source water comprises sulfate and carbonates, and combinations thereof.

The BF desalination system and the MBF desalination system are multi-evaporation systems without supplying additional heat after the brine heater of each train, and a multi-concentration system without supplying additional feed stream after the first train. With the enable de-scaling method, the inventive BF and MBF desalination concepts are also applicable to backward fed multi-effects, forward fed multi-effects, combinations of backward fed and forward fed multi-effects, membrane distillation (indirect contact membrane distillation, vacuum membrane distillation, osmotic membrane distillation, etc.), vapor recompression evaporators, and the like.

It is worth noting that the multi-effect (ME) concept has been known in commodity industries (e.g., sugar) long before it became adopted by the desalination field in 1884. In such industries, the product is much more valuable than distillate, the size of a train is relatively small, and the number of effects in the train is very limited; thereby the most thermodynamically regenerative approach to concentrate a feed stream is applied. The regenerative approach is based on a backward feed mode, wherein a feed stream flows to the lowest temperature effect, and after partial evaporation, its concentrate cascades as a feed to each higher temperature effect in turn; thereby the energy extracted to heat the feed is only slightly warmer than the feed it is heating. Neither external feed pre-heaters nor flashing chambers (also refer to as flashing boxes, flashing pots, etc.) are utilized; only one form of heat transfer surface is required, and the required thermal energy is provided by increasing the heat transfer surface in each effect. Vapor is produced in this backward feed by true boiling. The structural simplicity of the backward fed multi-effect (BME) is comparable to, if not better, than the structural simplicity of MSF, despite the facts that MSF has been based on a forward feed mode and BME has been known long before MSF, but the point to be emphasized here is that the simplicity of concept is the key reason for the dominance of MSF since 1960.

However, seawater desalination would be impossible in a multi-effect train with this backward feed mode since it has the obvious disadvantages of conducting brine evaporation at the highest brine temperature and brine concentration thereby the highest scaling issues, and yet rejecting brine from the train at the highest temperature thereby the highest wasteful thermal energy. As such, it is believed that the backward feed multi-effect has never actually been practically applied to seawater desalination not only because of these pronounced prohibitive reasons, but also because of the contrived myth in desalination field whereby each train a desalination plant is operated independently. Indeed, it was considered an unsophisticated way of engineering the multi-effect concept in a backward fed train for seawater desalination.

Figure 5A:
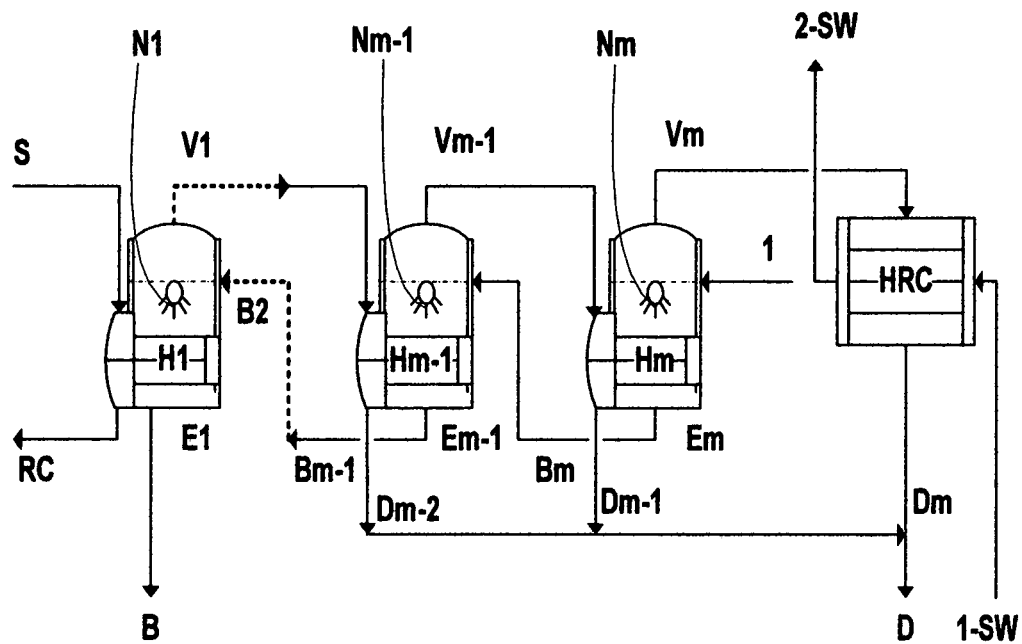
FIG. 5A illustrates a possible flow diagram for the backward fed multi-effect (BME) train.

FIG. 5A depicts a BME train comprises a plurality of effects [E1 to Em] arranges in series. E1 is the first effect and operated at the highest temperature, Em is the last effect and operated at the lowest temperature, and Em-1 is the preceding effect of the last effect [Em] in the BME train. For simplicity, FIG. 5A shows only these three effects [E1, . . . , Em-1, and Em] in the BME train since the remainder effects duplicate in function the effects shown, and the connections among these effects [E1 to Em] are indicated in FIG. 5A by dotted lines. Each effect has it is own evaporating surface [H1, . . . , Hm-1, and Hm], spray nozzles [N1, . . . , Nm-1, and Nm], a vapor stream [V1, . . . , Vm-1, and Vm], a condensed vapor stream (distillate) [ . . . , Dm-2, Dm-1, and Dm], and a brine stream [ . . . , "B2", "Bm-1", and "Bm"].

As shown in FIG. 5A, a feed stream [1] flows and sprays via the nozzles [Nm] on the outer surface of evaporating tubes [Hm] of the last effect [Em] of the BME train; wherein the last effect [Em] is operated at the lowest temperature and pressure, to produce a vapor stream [Vm] and a brine stream [Bm]. The brine stream [Bm] from the last effect [Em] of the BME train flows backward to the subsequent effect [Em-1] and then sprays via nozzles [Nm-1] on the outer surface of evaporating tubes [Hm-1] to produce a vapor stream [Vm-1] and a brine stream [Bm-1]. The brine stream [Bm-1] then flows in similar manner to the subsequent effect. As a brine stream flows backward from effect to effect, it is elevated in temperature and TDS level until it is discharged from the first effect [E1] at a pre-selected temperature and TDS level as a final brine stream [B] of the BME.

An external steam source [S] is fed into the inner side of the evaporating tubes [H1] of the first effect [E1] of the BME train. A portion of the feed stream of the first effect [E1], which is the brine stream [B2] from the second effect (not shown in FIG. 5A) evaporates, thereby the first effect [E1] produces a vapor stream [V1] and a brine stream, wherein the produced brine stream from the first effect [E1] is the final brine stream [B] of the BME train. Steam is condensed inside the evaporating tubes [H1] of the first effect [E1] and returned to its source as a returned condensate stream [RC].

The produced vapor stream [V1] from the first effect [E1] is fed into the inner side of evaporating tubes of the second effect of the BME train (not shown in FIG. 5A). It condenses after giving up its latent heat to the lesser temperature brine being sprayed on the outer surface of the evaporating tubes of the second effect. Here, spraying via nozzles in each of the effects is accompanied by flashing, thereby boiling (a spray film at the surface of the evaporating tubes) and flashing (spraying through the nozzles near the top of the effect under a reduced pressure) contribute to vapor production (which is after condensation in a next effect becomes distillate) in each effect, wherein boiling is dominant. The condensation of the vapor stream [V1] from the first effect [E1] occurs in the second effect [E2] at a temperature a few degrees lower than that in the first effect [E1] due to the successively lower pressure in each effect down the train. The condensate of the vapor stream [V1] from the first effect [E1] becomes the distillate stream of the second effect [E2] (not shown in FIG. 5A).

Similarly, the produced vapor stream from the second effect is fed to the inner side of evaporating tubes of a third effect and so on, thereby condensates (distillate Streams) [ . . . , Dm-2, Dm-1] flow from effect to effect (from E1 to Em-1) under gravity, except the produced vapor stream [Vm] from the last effect [Em], wherein the vapor stream [Vm] from the last effect [Em] is condensed [Dm] in the heat rejection condenser [HRC] of the BME train by a water source [1-SW]. Over 75% of the water source [1-SW] may be rejected [2-SW] from the heat rejection condenser [HRC]

of the BME train back to its source. The distillate [Dm] stream from the condensed vapor stream [Vm] from the last effect [Em] is combined with distillate streams [ . . . , Dm-2, Dm-1] from other effects as a final distillate stream [D] of the BME train.

Figure 5B:
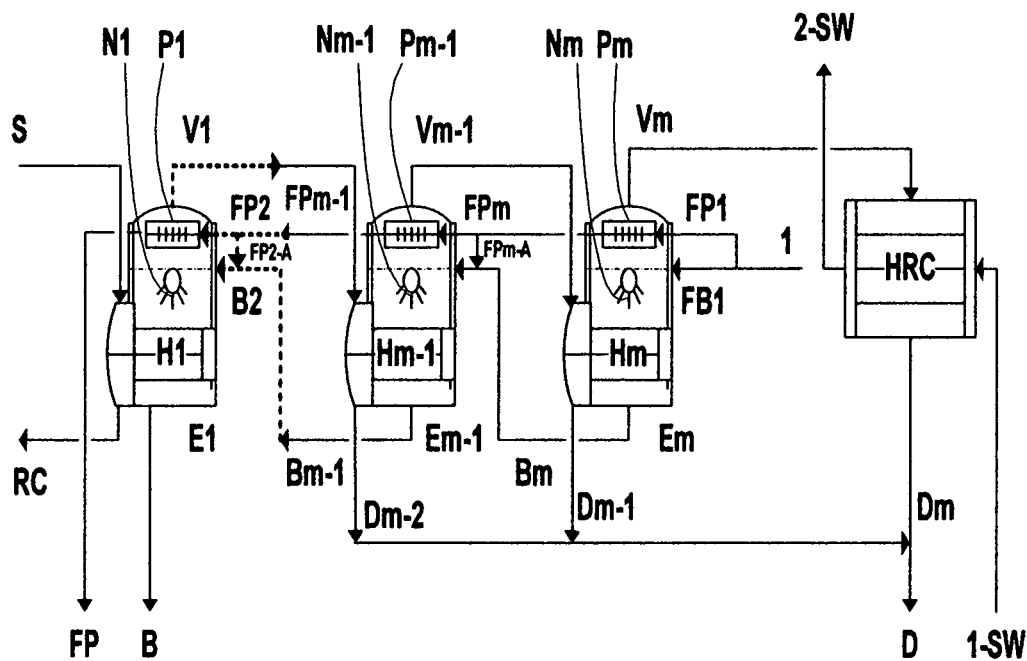
FIG. 5B illustrates another possible flow diagram for the BME train.

Since one of the objectives of this invention is to maximize distillate output, thereby an inventive modification of the BME train is depicted in FIG. 5B. Here, the BME train, as shown in FIG. 5B, further comprises a separate set of pre-heaters [Pm, Pm-1, . . . , P1]; wherein the set of the pre-heaters carries separately a portion [FP1, FPm, FPm-1, . . . , FP2, FP] of the feed stream [1]. One of the essential purposes of the pre-heaters in the MBE train is to provide in parallel an additional amount of heated feed [FP] to a subsequent train in, for example, the inventive MBF desalination system (not shown in FIG. 5B) at a temperature about the temperature of the final brine stream [B] from the MBE train. For example, a portion [FP1] of the feed stream [1] to the BME train flows separately to the last pre-heater [Pm] of the last effect [Em] of the BME first train; wherein it is gradually heated as it passes through the remainder of the pre-heaters, from the last effect [Em] to the first effect [E1], by the produced vapor [V1, . . . Vm-1, and Vm] from each effect until it exits [FP] the first effect [E1] of the BME train at a temperature that is about the temperature of the final brine stream [B] from the first effect [E1] of the BME train. This separately heated feed stream [FP] by the pre-heaters [Pm, Pm-1, . . . , P1] of the MBE train can be used as an additional feed to the next succeeding train in, for example, the inventive MBF desalination system (as described below).

The second purpose for the pre-heaters in the MBE train, as described above and shown in FIG. 5B, is to add an amount of feed [FPm-A, . . . , FP2-A] from each of the pre-heated feeds [FPm, . . . , FP2], after the last effect [Em], to the feed stream of each of the subsequent effects [Em-1, . . . , E1]. Each of these added amounts of feeds [FPm-A, . . . , FP2-A] to the feed stream of each effect, except the last effect [Em], is about the amount that is evaporated from each effect. The temperature of each of the added amounts of feeds [FPm-A, . . . , FP2-A] from the pre-heaters to each effect is about the temperature of the effect in which it is added to. This has the advantage to provide the same amount of feed to all effects in the MBE train; thereby producing about the same amount of distillate from each effect, which, in turn, increases the distillate output of the BME train.

Yet, the third purpose for the pre-heaters in the MBE train in providing additional heated feeds, as described above and shown in FIG. 5B, is to maximize the utility, rather than freely destructively rejecting the pre-heated cooling water [2-SW] from the heat rejection condenser [HRC] of the BME train back to its source.

Figure 6A:
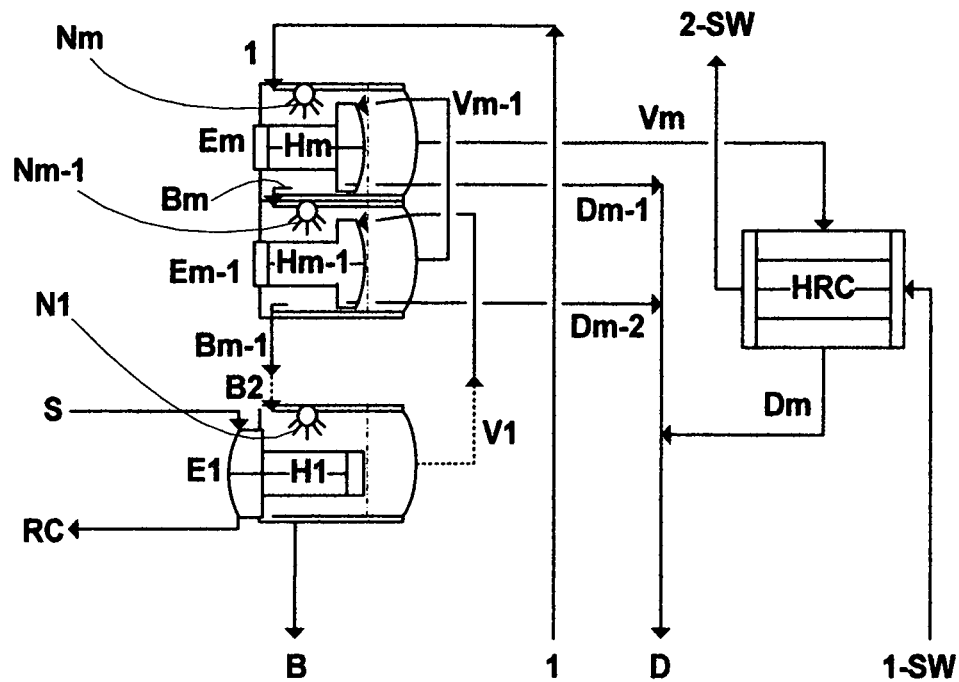
FIG. 6A illustrates a possible flow diagram for the vertically laid BME train.

Since one of the objectives of this invention is to minimize the utility of work energy (pumping power consumption), thereby an inventive vertical BME train is depicted in FIG. 6A. The effects as shown in FIG. 6A are arranged in series, which is similar to the arrangement of effects as shown in FIG. 5A, but the effects laid vertically; wherein the first effect [E1] is located at the bottom whereas the last effect [Em] is located at the top of the BME train. On the brine (feed) side, a feed stream [1] flows down to the last effect [Em] through the nozzles [Nm] and sprays on the outer surface of the evaporating tubes [Hm] in the last effect, wherein the last effect [Em] is operated at the lowest temperature of the BME. The brine stream [Bm] from the last effect [Em] flows by gravity to the next subsequent effect [Em-1] through the nozzles [Em-1] and sprays on the outer surface of the evaporating tubes [Hm-1] in the effect. A brine stream then flows in a similar manner to the subsequent effects until the first effect [E1], wherein the final brine stream [B] is discharged from the MBE train at a pre-selected temperature and TDS level. As such, pumps along with their power requirements to transfer a brine stream from effect to effect (e.g., in contrast with the BME train as shown in FIG. 5A) in the vertically laid BME train are eliminated.

On the vapor side, an external steam source [S], as shown in FIG. 6A, is fed into the inner evaporating tubes [H1] of the first effect [E1]. Steam gives up its latent heat to the sprayed brine stream [B2] (from the second effect; not shown in FIG. 6A) on the outer surface of the evaporating tubes [H1] of the first effect, and the condensed steam is discharged as a return condensate stream [RC]. The vertically laid BME train is operated at successively higher pressure and temperature from the first effect [E1] (the bottom one) to the last effect [Em] (the top effect). The effects may be arranged in equal pressure increments, from the top effect to the bottom effect (pressure decrements, from the bottom effect [E1] to the top effect [Em]), instead of the worn out route of just equal temperature increments. Such an arrangement provides an equal thermodynamic driving force at all effects, and allows a design freedom to reduce the evaporating surface (e.g., number of tubes) in the path of each subsequent vapor stream. Due to pressure differentials, temperature differentials, and higher vacuum in going up the effects (from the bottom effect [E1] to the top effect [Em]), vapor may be transferred from a higher pressure and temperature effect to a subsequent lower pressure and temperature effect. An orifice or a tube (e.g., low pressure in the orifice or the tube, high pressure in destination) may also be used to maintain a sufficient vapor velocity in evaporating tubes. As such, vapor [V1] from the first effect [E1] is fed into the evaporating tubes of the second effect (not shown in FIG. 6A), wherein it gives up its latent heat to the brine stream being sprayed on the surface of the evaporating tubes in the second effect, thereby condensing the vapor [V1] from the first effect in the second effect, which becomes the distillate stream of the second effect. Similarly, vapor from the second effect is fed to the evaporating tubes of the third effect and so on. The condensate from each effect flows under gravity from effect to effect, except the last effect [Em], wherein the vapor stream [Vm] from the last effect [Em] is condensed [Dm] in the heat rejection condenser [HRC].

Figure 6B:
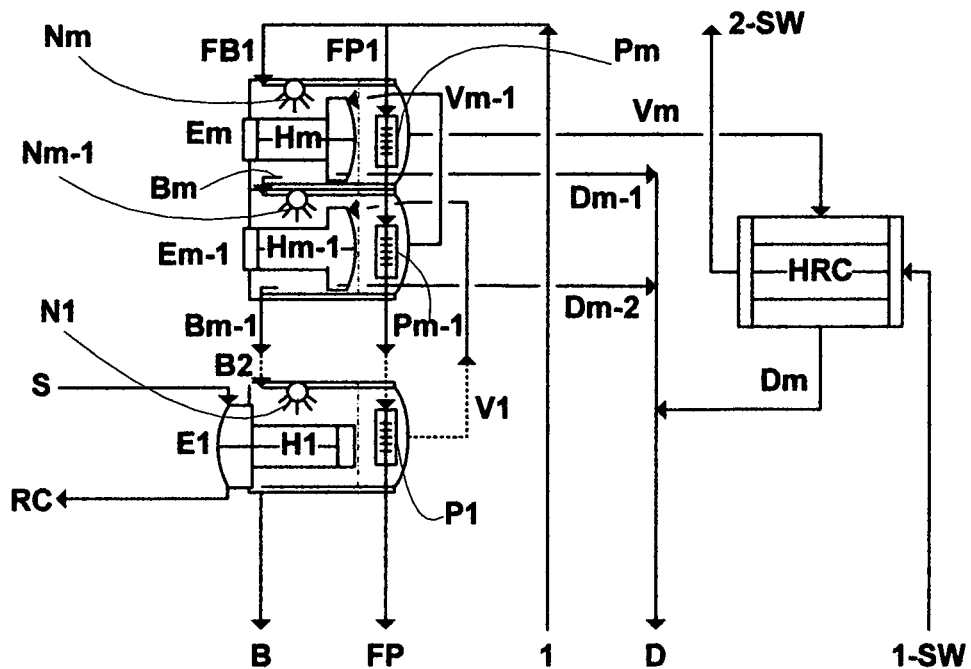
FIG. 6B illustrates another possible flow diagram for the vertically laid BME train.

Yet, the vertically laid BME train, as shown in FIG. 6B, further comprises a separate set of pre-heaters [P1, . . . , Pm-1, and Pm]. Each set of the pre-heaters carries separately a portion [FP1] of the feed stream [1] to the last effect [Em] of the MBE train to produce a separately heated feed stream [FP] from the first effect [E1] (as described hereinabove in Paragraphs [0057]-[0059]). Here again, pumps along with their power requirements to transfer the pre-heated stream from effect to effect (in contrast with the BME train as shown in FIG. 5A) in the vertically laid BME train are eliminated. Further, a portion of the pre-heated feed stream may also be split off at each effect and added to the flowing brine in that effect (not shown in FIG. 6B, but it is shown in FIG. 5B and described herein above in Paragraph [0058]). The amount added is approximately equal to the amount that is evaporated in that effect, thereby all effects would have the same amount of brine flow.

It should be understood that the vertically laid BME train (FIGS. 6A and 6B) in yet a further embodiment of this invention can be operated independently as standalone train;

thereby it can be used to concentrate a feed stream in industries such as, but not limited to, food, commodity, chemical, pharmaceutical, oil-gas, and the like.

Figure 7:
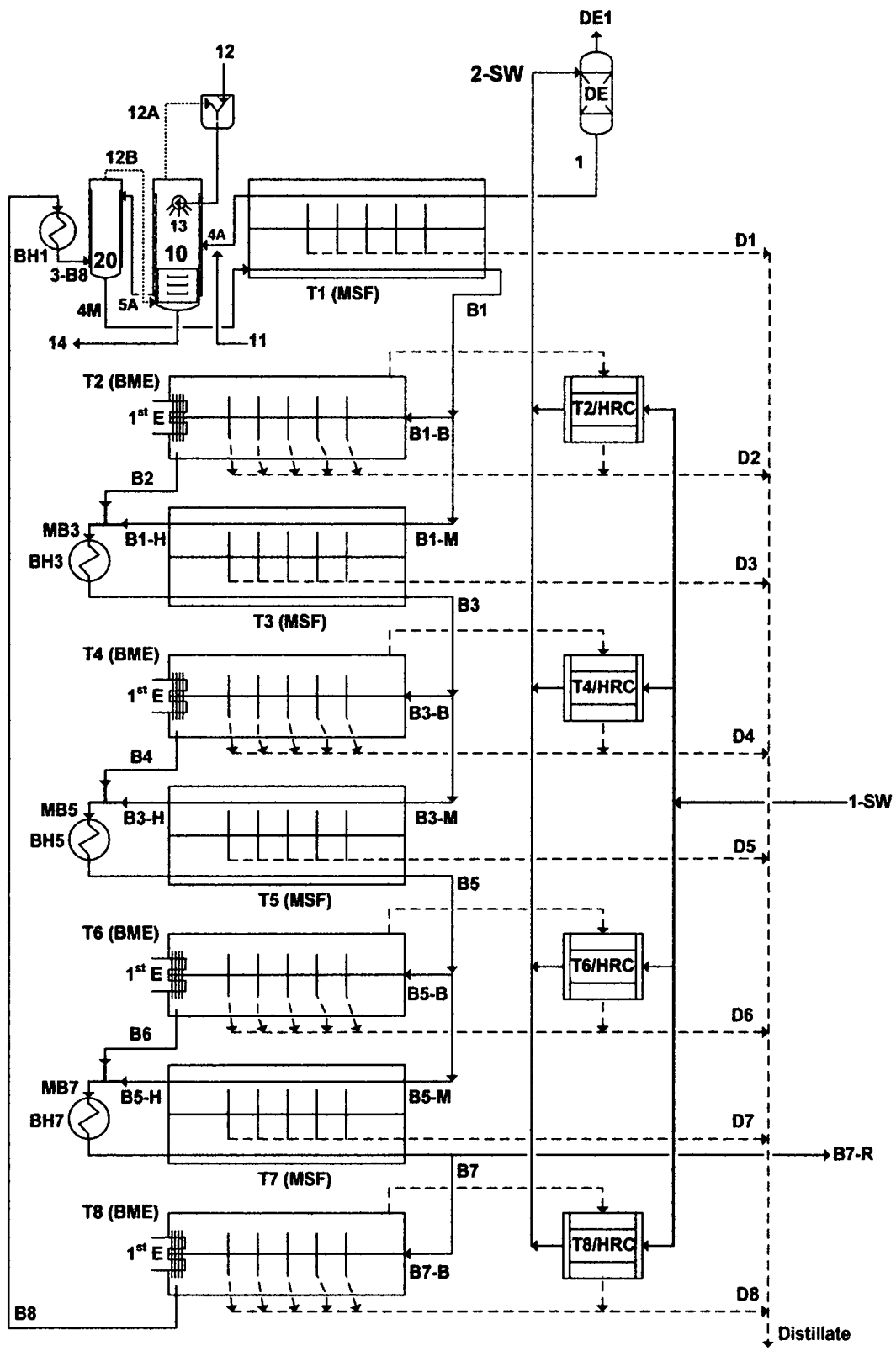
FIG. 7 illustrates a further possible flow diagram for the inventive MBF desalination system.

In yet a further embodiment of this invention as depicted in FIG. 7, BME trains are incorporated in a Mixed Brine Forward (MBF) desalination system. Here, the MBF desalination system comprises a plurality of trains arranges in series, in which the trains alternate between a multi-flash stage (MSF) train and a backward fed multi-effect (BME) train. The lead train in the MBF desalination system is a MSF first train, and the backend train in the MBF desalination system is a BME last train. Each of the MSF trains comprises a heat gain section and a brine heater, except the MSF first train, wherein the MSF first train comprises a brine heater, two modified flash stages, and a heat gain section. Each of the BME trains comprises a heat rejection condenser. Each train in the MBF desalination system produces a distillate stream and a brine stream. Portions of water source [1-SW] are pre-heated in each of the heat rejection condensers ([T2-HRC], [T4-HRC], ([T6-HRC] and [T8-HRC]) of each of the BME trains ([T2-BME], [T4-BME], ([T6-BME] and [T8-BME]), and the combined pre-heated water source [2-SW] is de-aerated [DE] to produce a feed stream [1]. The feed stream [1] flows through inner tubes of a set of pre-heaters in the heat gain section of the MSF first train [T1-MSF]. The feed stream at the exit [4A] of the heat gain section of the MSF first train [T1-MSF] is mixed with aluminum hydroxide or iron hydroxide [11] and then is released in a first modified flash stage [10] to be contacted with an organic hydroxide source [12], wherein the organic hydroxide source is sprayed via nozzles [13] into the first modified flash stage [10], thereby simultaneously vigorously forming precipitates comprising magnesium sulfoaluminate or magnesium sulfoferrate, and recovering the organic hydroxide source, wherein the recovered organic hydroxide source [12A] is recycled to the first modified flash stage, and precipitates are removed [14] from the first modified flash stage [10] to produce a first de-scaled stream [5A]. The brine stream [B8] from the BME last train [T8-BME] passes through the brine heater [BH1] of the MSF first train [T1-MSF] to gain further heat. The brine stream at the exit [3-B8] of the brine heater [BH1] of the MSF first train [T1-MSF] is released in a second modified flash stage [20] to be flashed and mixed with the first de-scaled stream [5A] from the first modified flash stage [10], thereby producing a vapor stream containing trace amounts of the organic hydroxide source [12B], and producing a de-scaled feed stream [4M]. The vapor stream containing trace amounts of the organic hydroxide source [12B] flows to the first modified flash stage [10]. The de-scaled feed stream [4M] flows downstream to the heat gain section of the MSF first train [T1-MSF] to produce a distillate stream and a brine stream. Thereinafter, the brine stream (e.g., [131]) from each of the MSF trains ([T1-MSF], [T3-MSF], and [T5-MSF]) splits off and passes as input feed streams (e.g., [B1-B] and [B1-M]) to the next succeeding BME [e.g., T2-BME] and MSF [T3-MSF] trains, except the MSF last train [T7-MSF], wherein a portion [B7-B] of the brine stream [B7] from the MSF last train [T7-MSF] passes as a feed input to the BME last train [T8-BME], and the remainder [B7-R] of the brine stream [137] from the MSF last train [T7-MSF] is discharged from the MBF desalination system. The brine stream from each of the BME trains (e.g., [B2]) passes as an input feed stream to the next succeeding MSF train (e.g., [T3-MSF]), except the BME last train, wherein the brine stream [B8] from the BME last train [T8-BME] is fed to the brine heater [BH1] of the MSF first train [T1-MSF]. In each of the successive MSF trains ([T3-MSF], [T5-MSF] and [T7-MSF]), after the MSF first train [T1-MSF], each of heated feed streams (e.g., [B1-H] at the exit of each of the heat gain sections of each of the MSF trains (e.g., [T3-MSF]) is at a temperature about the temperature of the brine stream (e.g., [B2]) from each of the preceding BME trains (e.g., [T2-BME]), wherein each of the heated feed streams (e.g., [B1-H]) is mixed with each of the brine streams (e.g., [B2]) from each of the preceding BME trains (e.g., [T2-BME]) to form a mixed brine stream (e.g., [MB3]) at the entry to each of the brine heaters (e.g., [BH3]) of each of the MSF trains (e.g., [T3-MSF]). Each of the mixed brine streams ([MB3], [MB5], and [MB7]) passes through each of the brine heaters ([BH3], [BH5], and [BH7]), and flows downstream to each of the heat gain sections of each of the MSF trains ([T3-MSF], [T5-MSF], and [T7-MSF]), wherein each of these MSF trains produces a distillate stream [D3, D5, and D7] and a brine stream [B3, B5, and B7].

Each of the BME trains ([T2-BME], [T4-BME], [T6-BME] and [T8-BME]) as shown in FIG. 7 (for simplicity, they are depicted in over simplified blocks) may be laid horizontally (as shown in FIGS. 5A and 5B), vertically (as shown in FIGS. 6A and 6B), and combinations thereof.

Figure 8:
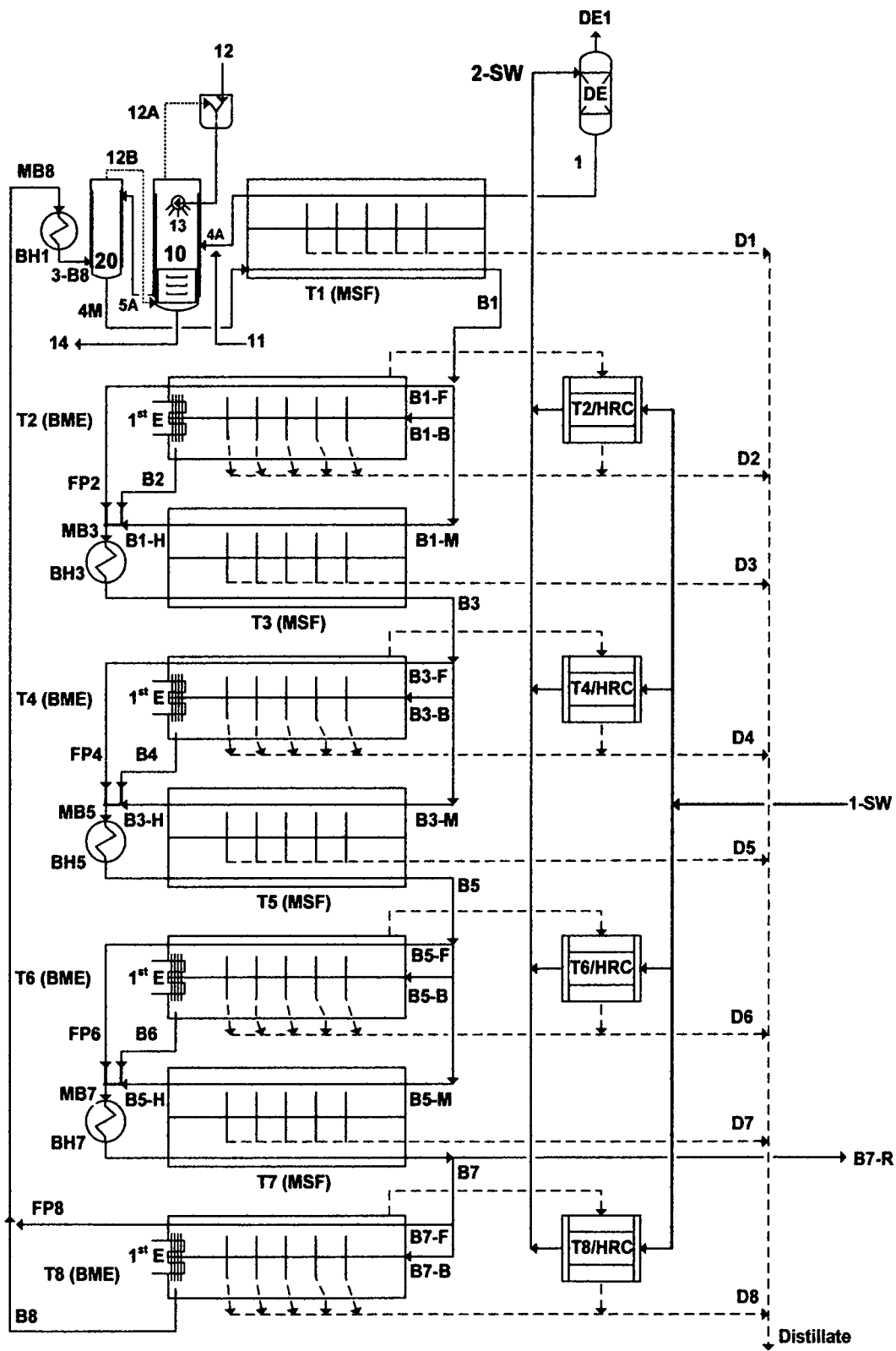
FIG. 8 illustrates yet a further possible flow diagram for the inventive MBF desalination system.

In yet a further embodiment as depicted in FIG. 8, each of the BME trains ([T2-BME], [T4-BME], [T6-BME] and [T8-BME]) further comprises a separate set of feed pre-heaters. Each set of the pre-heaters in each of the BME trains carries separately a portion of the feed stream to each of the BME trains, wherein the feed stream to each of the BME trains is a portion of the brine stream from a preceding MSF train, to produce a separately heated feed stream at the exit of the first effect of each of the BME trains. For example, the brine stream [131] from the MSF first train [T1-MSF] splits off and passes as input feed streams ([B1-F], [B1-B] and [B1-M]), wherein B1-F is the portion that flows through the separate set of feed pre-heaters in the BME second train [T2-BME], B1-B is the portion that sprays over the evaporating surface of the last effect of the BME second train [T2-BME], and B1-M is the portion that flows through the heat gain section of the MSF third train [T3-MSF]. The heated feed stream from the feed pre-heaters [FP2] and brine stream [B2] from the BME second train [T2-BME] are then mixed with heated feed stream [B1-H] from the heat gain section of the MSF third train [T3-MSF], wherein the temperatures of these streams ([FP2], [B2] and [B1-H]) are about the same, thereby forming a mixed brine stream [MB3] at the entry to the brine heater [BH3] of the MSF third train [T3-MSF]. The same goes for remainder of the BME trains, except the BME last train [T8-BME], wherein the brine stream [B7] from the MSF last train [T7-MSF] splits off as input feed streams ([B7-F] and [B7-B]) to the BME last train [T8-BME] and as a reject brine stream [B7-R] from the MSF last train [T7-MSF] to be discharged from the MBF desalination system, wherein B7-F is the portion that flows through the separate set of feed pre-heaters in the BME last train [T8-BME], and B7-B is the portion that flows through the evaporating surfaces of the BME last train [T8-BME]. The heated feed stream in the feed pre-heaters [FP8] and the brine stream [B8] from the BME last train [T8-BME] are mixed to form a mixed brine stream [MB8], and the mixed brine stream [MB8] is fed to the brine heater [BH1] of the MSF first train [T1-MSF].

In yet a further embodiment (not shown in FIG. 8), each effect in each of BME trains produces the same amount of distillate by adding a portion of a pre-heated feed in a pre-heater of an effect, after the last effect, to the feed stream of a subsequent effect. Each of these added amounts of feeds to the flowing brine of each effect, except the last effect, is about the evaporated amount from the effect in which it is added to. The temperature of each of the added amounts of feeds from the pre-heaters to each effect is also about the temperature of the effect in which it is added to.

sumption of M.P. steam to ejectors; and safe guarding the marine environment and marine inhabitants. Therefore, the Brine Forward (BF) desalination concept and the Mixed Brine Forward (MBF) desalination concept, in conjunction with the enabling de-scaling method, are inventively provided.

TABLE 1

Natural Composition and Altered Composition of Seawater.

| | Seawater (SW) Natural Composition | | | | | SW Altered Composition | |
| --- | --- | --- | --- | --- | --- | --- | --- |
| Ion | mg/L | wt % | mol/kg ($m_{ion}$) | $m_{ion}/m_{Cl}$ | meq/L | meq/L* (mg/L) | meq/L** (mg/L) |
| $Na^+$ | 12,173 | 1.2173 | 0.5169 | 0.8690 | 529.5 | 592.6 | 631.7 |
| $K^+$ | 423 | 0.0423 | 0.0106 | 0.0178 | 10.8 | 13.4 | 15.6 |
| $Mg^{+2}$ | 1,529 | 0.1529 | 0.0614 | 0.1032 | 125.8 | 155.2 | 176.5 |
| $Ca^{+2}$ | 530 | 0.0530 | 0.0129 | 0.0217 | 26.5 | 33.4 | 35.0 |
| $Sr^{+2}$ | 5 | 0.0005 | 0.0006 | 0.0010 | 0.11 | 0.16 | 0.18 |
| $Cl^-$ | 21,600 | 2.1600 | 0.5948 | 1.0000 | 609.3 | 720.7 | 781.6 |
| $HCO_3^-$ | 140 | 0.0140 | 0.0022 | 0.0037 | 2.3 | 2.4 | 2.4 |
| $SO_4^{-2}$ | 3,100 | 0.3100 | 0.0315 | 0.0530 | 64.5 | 78.5 | 85.4 |
| TDS | 39,500 | 3.9500 | 1.2310 | | 1,368.8 | 1,596.4 (46,200) | 1,728.4 (49,950) |
| pH | 7.9-8.1 | | | | | | |
| $MgCl_2/\Sigma Mg$ | | | | | 0.68 | 0.69 | 0.70 |
| $Ca^{+2}/SO_4^{-2}$ | | | | | 0.41 | 0.43 | 0.41 |
| $Ca^{+2}/Mg^{+2}$ | | | | | 0.21 | 0.21 | 0.20 |
| $Mg^{+2}/SO_4^{-2}$ | | | | | 1.95 | 2.00 | 2.07 |

*after 3 years of operating a desalination plant comprising eight independent RB-MSF trains;
**after 7 years of operating the same desalination plant.

Each of the brine heaters ([BH1], [BH3], [BH5] and [BH7]) in each of the MSF trains as shown in FIGS. 7 and 8 may be eliminated, thereby the brine stream [B8] or the mixed brine stream [MB8] from the last BME train [T8-BME] flows directly to the second modified flash stage [20] of the MSF first train [T1-MSF], and each of the mixed brine streams ([MB3], [MB5], and [MB7]) flows directly downstream to each of the heat gain sections of each of the MSF first trains ([T3-MSF], [T5-MSF] and [T7-MSF]).

The MBF desalination system as shown in FIGS. 7 and 8 may include an additional MSF train as a backend train. In other words, the MBF desalination system further comprises an odd number of alternating trains, wherein the lead train is a MSF train and the backend train is also a MSF train. Here, the brine stream from the BME last train passes as a feed input stream to the backend MSF train (the MSF last train in the MBF desalination system), and a portion of the reject brine stream from this added MSF last train (not shown in FIGS. 7 and 8) is fed to the MSF first train in a separate set of pre-heaters (similar to the MSF first train as shown in FIG. 4 and described hereinabove).

As described hereinabove, this invention is built on the ground of disarming scale formation with the objectives of eliminating the use of scale inhibitors thereby lifting the imposed restriction on top brine temperatures; eliminating the theme of independently operating multiple trains in a desalination system; eliminating constantly re-circulating an enormous amount of brine (recycle brine) in each train thereby drastically reducing major pumping power requirements; producing more amounts of distillate at less consumption of steam; rejecting less amounts of brine whereby the reject brine is readily usable in other applications; eliminating reject cooling seawater from a heat rejection section and heat rejection condensers thereby effectively lessening amounts of seawater feed and utilizing less pumping power; improving de-aeration thereby lessening con-

TABLE 2

Relevant Properties of Fluids.

| Fluid | $T_b$ (° C.) | $C_p$ (kJ/kg° C.) | $H_{vap}$ (kJ/kg) |
| --- | --- | --- | --- |
| Pure $H_2O$ | 100.00 | 4.22 | 2,256.5 |
| Seawater (SW) | 100.71 | 4.02 | 2,166.2 |
| $NH_3$ | -33.45 | 2.19 | 1,370.8 |
| $MA(CH_5N)$ | -6.35 | 3.28 | 790.8 |
| $DMA(C_2H_7N)$ | 6.85 | 3.03 | 587.4 |
| $EA(C_2H_7N)$ | 16.55 | 2.85 | 621.8 |
| $DEA(C_4H_{11}N)$ | 55.45 | 2.44 | 380.4 |
| $IPA(C_3H_9N)$ | 32.45 | 2.77 | 460.1 |
| $DIPA(C_6H_{15}N)$ | 83.95 | 2.64 | 341.9 |
| $PA(C_3H_9N)$ | 48.65 | 2.75 | 502.6 |
| $DPA(C_6H_{15}N)$ | 109.35 | | 368.6 |

$T_b$: Normal Boiling Point; $C_p$: Specific Heat Capacity at $T_b$; $H_{vap}$: Enthalpy of Vaporization at $T_b$; and SW (Table 1, Natural Salts Composition).

What is claimed is:

1. A method for desalinating a feed stream of a water source to produce a cumulative distillate stream and a reject brine stream, said method comprising:
   a Brine Forward (BF) desalination system, which comprises a plurality of MSF trains arranged in series, wherein each of said MSF trains comprises a brine heater and a heat gain section, wherein said heat gain section comprises a number of flash stages, wherein a MSF first train further comprises a modified flash stage, wherein each of said flash stages and the modified flash stage comprise a flashing zone and a heating zone, wherein said heating zone comprises internal heating tubes; and
   an input feed arrangement, which comprises flowing said feed stream to a heating zone of a last flash stage of only said MSF first train; and thereafter applying a brine flow sequence, wherein a brine stream from a proceeding MSF train flows to a heating zone of a last flash stage of a next succeeding MSF train, and after successive heating in a heating zone of each of flash stages and then further heating in a brine heater of said next succeeding MSF train, is supplied as an input feed to a flashing zone of a first flash stage of said next succeeding MSF train;

thereby said feed stream is supplied to the heating zone through the internal heating tubes of the last flash stage of said MSF first train, and after successive heating in the heating zone of each of the flash stages, in the heating zone of the modified flash stage, and in the brine heater of said MSF first train, said feed stream at the exit of the brine heater is mixed with aluminum hydroxide or iron hydroxide and then is released in the modified flash stage to be contacted with an organic hydroxide source, whereby said organic hydroxide source is sprayed via nozzles into the modified flash stage, thereby simultaneously vigorously forming precipitates comprising magnesium sulfoaluminate or magnesium sulfoferrate, and recovering said organic hydroxide source, wherein the recovered said organic hydroxide source is recycled to the modified flash stage, wherein said precipitates are removed from the modified flash stage to produce a de-scaled feed stream;

wherein said de-scaled feed stream is supplied as the input feed to the flashing zone of the first flash stage of said MSF first train, and after successive flashing in the flashing zone of each of the flash stages of said MSF first train to produce the distillate stream, is discharged as the brine stream of said MSF first train at the lowest temperature and the highest total dissolved solids (TDS);

wherein the brine stream of said MSF first train is supplied to the heating zone through the internal heating tubes of the last flash stage of a MSF second train, and after successive heating in the heating zone of each of the flash stages and then further heating in the brine heater of said MSF second train, is supplied as the input feed to the flashing zone of the first flash stage of said MSF second train, and after successive flashing in the flashing zone of each of the flash stages of said MSF second train to produce the distillate stream, is discharged as the brine stream from the flashing zone of the last flash stage of said MSF second train at the lowest temperature and the highest TDS; and thereafter said brine flow sequence, which is flowing said brine stream of said proceeding MSF train to said heating zone of said last flash stage of said next succeeding BME train; is successively maintained through the remainder of the series to a MSF last train, wherein the brine stream from said MSF last train is discharged as said reject brine stream.

2. The method of claim 1, comprising the steps of: (a) adding a heat rejection section to said MSF last train; (b) pre-heating said water source in said heat rejection section of said MSF last train to produce a pre-heated water source; and (c) de-aerating said pre-heated water source to produce said feed stream.

3. The method of claim 1, wherein said organic hydroxide source is selected from the group consisting of isopropylamine, propylamine, dipropylamine, diisopropylamine, ethylamine, diethylamine, methylamine, dimethylamine, ammonia, and combinations thereof.

4. The method of claim 1, further comprising the steps of: (a) polishing at least the distillate stream from said MSF first train by exchanging residues of said organic hydroxide source in the distillate stream on a strong acid cation resin with an aqueous stream containing calcium hydroxide, thereby exchanging said residues of said organic hydroxide source in the distillate stream with calcium; (b) regenerating the exhausted said cation resin by acid to displace said residues of said organic hydroxide source from said cation resin; and (c) recycling the regenerate stream containing the displaced said residues of said organic hydroxide source from said cation resin to said water source.

5. The method of claim 1, further comprising the steps of: (a) mixing said feed stream with at least a portion of the brine stream from said MSF last train to produce a mixed feed stream; and (b) desalinating said mixed feed stream by a Mixed Brine Forward (MBF) desalination system to produce said cumulative distillate stream and said reject brine stream, which comprises: a plurality of said MSF trains arranged in series, wherein each of said MSF trains comprises said brine heater and said heat gain section, wherein said heat gain section comprises a number of said flash stages, wherein said MSF first train further comprises said modified flash stage, wherein each of said flash stages and the modified flash stage comprise said flashing zone and said heating zone, wherein said heating zone comprises said internal heating tubes; and said input teed arrangement, which comprises flowing said mixed feed stream to said heating zone of said last flash stage of only said MSF first train; and thereafter applying said brine flow sequence, wherein said brine stream from said proceeding MSF train flows to said heating zone of said last flash stage of said next succeeding MSF train, and after successive heating in said heating zone of each of said flash stages and then further heating in said brine heater of said next succeeding MSF train, is supplied as said input feed to said flashing zone of said first flash stage of said next succeeding MSF train; thereby said mixed feed stream is supplied to the heating zone through the internal heating tubes of the last flash stage of said MSF first train, and after successive heating in the heating zone of each of the flash stages, in the heating zone of the modified flash stage and in the brine heater of said MSF first train, said mixed feed stream at the exit of the brine heater is mixed with said aluminum hydroxide or said iron hydroxide and then is released in the modified flash stage to be contacted with said organic hydroxide source, whereby said organic hydroxide source is sprayed via said nozzles into the modified flash stage, thereby simultaneously vigorously forming said precipitates comprising said magnesium sulfoaluminate or said magnesium sulfoferrate, and recovering said organic hydroxide source, wherein the recovered said organic hydroxide source is recycled to the modified flash stage, wherein said precipitates are removed from the modified flash stage to produce said de-scaled feed stream; wherein said de-scaled feed stream is supplied as the input feed to the flashing zone of the first flash stage of said MSF first train, and after successive flashing in the flashing zone of each of the flash stages of said MSF first train to produce the distillate stream, is discharged as the brine stream of said MSF first train at the lowest temperature and the highest TDS; wherein the brine stream of said MSF first train is supplied to the heating zone through the internal heating tubes of the last flash stage of a MSF second train, and after successive heating in the heating zone of each of the flash stages and then further heating in the brine heater of said MSF second train, is supplied as the input feed to the flashing zone of the first flash stage of said MSF second train, and after successive flashing in the flashing zone of each of the flash stages of said MSF second train to produce the distillate stream, is discharged as the brine stream from the flashing zone of the last flash stage of said MSF second train at the lowest temperature and the highest TDS; and thereafter said brine flow sequence, which is flowing said brine stream of said proceeding MSF train to said heating zone of said last flash stage of said next succeeding BME train; is successively maintained through the remainder of the series to a MSF last train, wherein the brine stream from said MSF last train is discharged as said reject brine stream.

6. The method of claim 1, further comprising the steps of: (a) introducing at least a portion of the reject brine stream from said MSF last train to the heat gain section of said MSF first train; and (b) applying a Mixed Brine Forward (MBF) desalination system to produce said cumulative distillate stream and said reject brine stream, which comprises: a plurality of said MSF trains arranged in series, wherein each of said MSF trains comprises said brine heater and said heat gain section, wherein said heat gain section comprises a number of said flash stages, wherein each of said flash stages comprises said flashing zone and said heating zone, wherein said heating zone comprises said internal heating tubes, with the exception of said MSF first train, wherein said MSF first train further comprises two modified flash stages and two sets of internal heating tubes; and said input feed arrangement, which comprises separately flowing said feed stream and at least a portion of the brine stream of said MSF last train to said heating zone of said last flash stage of only said MSF first train; and thereafter applying said brine flow sequence, wherein said brine stream from said proceeding MSF train flows to said heating zone of said last flash stage of said next succeeding MSF train, and after successive heating in said heating zone of each of said flash stages and then further heating in said brine heater of said next succeeding MSF train, is supplied as said input feed to said flashing zone of said first flash stage of said next succeeding MSF train; thereby said feed stream is supplied to the heating zone through the first set of the internal heating tubes of the last flash stage of said MSF first train, and after successive heating in the heating zone of each of the flash stages, said feed stream at the exit of the heating zone of the first flash stage is mixed with said aluminum hydroxide or said iron hydroxide and then is released in the first modified flash stage to be contacted with said organic hydroxide source, whereby said organic hydroxide source is sprayed via said nozzles into the first modified flash stage, thereby simultaneously vigorously forming said precipitates comprising said magnesium sulfoaluminate or said magnesium sulfoferrate, and recovering said organic hydroxide source, wherein the recovered said organic hydroxide source is recycled to the first modified flash stage, wherein said precipitates are removed from the first modified flash stage to produce a first de-scaled feed stream; wherein at least a portion of the brine stream from said MSF last train is supplied to the heating zone through the second set of the internal heating tubes of the last flash stage of said MSF first train, thereby passing, in series, through the heating zone of each of the flash stages, the first modified flash stage and the second modified flash stage, before passing through the brine heater of said MSF first train to gain further heat, thereby producing a heated brine stream, wherein the heated brine stream is released in the second modified flash stage to be flashed and mixed with the first de-scaled stream from the first modified flash stage, thereby producing said de-scaled feed stream and a vapor stream containing trace amounts of said organic hydroxide source, wherein said vapor stream containing trace amounts of said organic hydroxide source is recycled to the first modified flash stage; wherein said de-scaled feed stream is supplied as the input feed to the flashing zone of the first flash stage of said MSF first train, and after successive flashing in the flashing zone of each of the flash stages of said MSF first train to produce the distillate stream, is discharged as the brine stream of said MSF first train at the lowest temperature and the highest TDS; wherein the brine stream of said MSF first train is supplied to the heating zone through the internal heating tubes of the last flash stage of a MSF second train, and after successive heating in the heating zone of each of the flash stages and then further heating in the brine heater of said MSF second train, is supplied as the input feed to the flashing zone of the first flash stage of said MSF second train, and after successive flashing in the flashing zone of each of the flash stages of said MSF second train to produce the distillate stream, is discharged as the brine stream from the flashing zone of the last flash stage of said MSF second train at the lowest temperature and the highest TDS; and thereafter said brine flow sequence, which is flowing said brine stream of said proceeding MSF train to said heating zone of said last flash stage of said next succeeding BME train; is successively maintained through the remainder of the series to a MSF last train, wherein the brine stream from said MSF last train is discharged as said reject brine stream.

7. A method for desalinating a feed stream of a water source to produce a cumulative distillate stream and a reject brine stream, said method comprising:

a Mixed Brine Forward (MBF) desalination system, which comprises at least a pair of trains arranged in series and alternated in opposing feed evaporation modes, wherein said pair of trains comprises a leading multi-stage flash (MSF) train and a following backward fed multi-effect (BME) train; wherein said MSF train comprises a brine heater and a heat gain section, wherein said heat gain section comprises a number of flash stages, wherein each of said flash stages comprises a flashing zone and a heating zone, wherein said heating zone comprises said internal heating tubes, wherein said MSF train further comprises two modified flash stages; wherein said BME train comprises a heat rejection condenser and a number of effects, wherein said effects are serially connected and horizontally arranged, wherein each of said effects comprises a boiling zone and a heating zone, wherein said boiling zone comprises spray nozzles and boiling tubes, wherein said heating zone comprises heating tubes, wherein a first effect in said BME train is the highest temperature and pressure effect, wherein a last effect in said BME train is the lowest temperature and pressure effect; wherein each train produces a distillate stream and a brine stream; wherein said water source is pre-heated in said heat rejection condenser of said BME train to produce a pre-heated water source, wherein at least a portion of said pre-heated water source is de-aerated to produce said feed stream;

wherein said feed stream is supplied to the heating zone through the internal heating tubes of the last flash stage of said MSF train, and after successive heating in the heating zone of each of the flash stages, said feed stream at the exit of the heating zone of the first flash stage is mixed with aluminum hydroxide or iron hydroxide and then is released in the first modified flash stage to be contacted with an organic hydroxide source, whereby said organic hydroxide source is sprayed via nozzles into the first modified flash stage, thereby simultaneously vigorously forming precipitates comprising magnesium sulfoaluminate or magnesium sulfoferrate, and recovering said organic hydroxide source, wherein the recovered said organic hydroxide source is recycled to the first modified flash stage, wherein said precipitates are removed from the first modified flash stage to produce a first de-scaled feed stream; wherein a brine stream and a parallel heated feed from said BME train are combined and supplied to the brine heater of said MSF train to gain further heat to produce a heated mixed brine stream, wherein the heated mixed brine stream is released in the second modified flash stage to be flashed and mixed with the first de-scaled stream from the first modified flash stage, thereby producing a de-scaled feed stream and a vapor stream containing trace amounts of said organic hydroxide source, wherein said vapor stream containing trace amounts of said organic hydroxide source is recycled to the first modified flash stage;

wherein said de-scaled feed stream is supplied to the flashing zone of the first flash stage of said MSF train, and after successive flashing in the flashing zone of each of the flash stages of said MSF train to produce the distillate stream, is discharged as the brine stream of said MSF train at the lowest temperature and highest total dissolved solids (TDS);

wherein at least a portion of the brine stream of said MSF train is discharged as said reject brine stream, and the remainder is divided into two slip portions;

wherein a first slip portion of the brine stream from said MSF train is supplied to the boiling zone through the spray nozzles and sprayed onto the boiling tubes of said last effect of said BME train, which is the lowest temperature effect, and after partial evaporation, is pumped to the boiling zone of each higher temperature effect in turn, and is discharged as the brine stream from the boiling zone of said first effect of said BME train at the highest temperature and TDS;

wherein a second slip portion of the brine stream from said MSF train is supplied to the heating zone through the heating tubes of the last effect of said BME train, and after partial heating by a flashing fraction of vapor in the last effect, is passed to the heating zone of each higher temperature effect in turn to gain heat proportional to the temperature rise between the effects, and is discharged as the parallel heated feed from the heating zone of the first effect of said BME train at the highest temperature; and wherein the brine stream and the parallel heated feed of said BME train are combined and supplied to the brine heater of said MSF first train.

8. The method of claim 7, further comprising the step of eliminating the brine heater of said MSF train, thereby the brine stream and the parallel heated feed of said BME train are combined and supplied to the second modified flash stage of said MSF train.

9. The method of claim 7, further comprising the step of eliminating the parallel heated feed of said BME train, thereby eliminating said heating tubes of said heating zone in each of said effects.

10. The method of claim 7, further comprising the steps of maintaining the two modified flash stages and replacing said MSF train including the brine heater by a forward fed multi-effect (FME) train, wherein each effect of said FME train comprises said boiling zone and said heating zone.

11. The method of claim 7, wherein said organic hydroxide source is selected from the group consisting of isopropylamine, propylamine, dipropylamine, diisopropylamine, ethylamine, diethylamine, methylamine, dimethylamine, ammonia, and combinations thereof.

12. The method of claim 7, further comprising the steps of: (a) polishing at least the distillate stream from said MSF first train by exchanging residues of said organic hydroxide source in the distillate stream on a strong acid cation resin with an aqueous stream containing calcium hydroxide, thereby exchanging said residues of said organic hydroxide source in the distillate stream with calcium; (b) regenerating the exhausted said cation resin by acid to displace said residues of said organic hydroxide source from said cation resin; and (c) recycling the regenerate stream containing the displaced said residues of said organic hydroxide source from said cation resin to said pre-heated water source prior to de-aeration.

13. The method of claim 7, further comprising the step of replacing said BME train by a vertical backward fed multi-effect (VBME) train, which comprises:

said heat rejection condenser and a number of effects serially connected and vertically arranged, wherein each of said effects comprises said boiling zone and said heating zone, wherein said boiling zone comprises said spray nozzles and said boiling tubes, wherein said heating zone comprises said heating tubes; wherein said first effect, which is the highest temperature and pressure effect, is positioned at the bottom of said VBME train; wherein said last effect, which is the lowest temperature and pressure effect, is positioned at the top of said VBME train;

wherein the first slip portion of the brine stream from said MSF train is supplied to the boiling zone through the spray nozzles and sprayed onto the boiling tubes of said last effect, and after partial evaporation in said last effect, is supplied downward by gravity to the boiling zone of each higher temperature effect in turn, and is discharged as the brine stream from the boiling zone of said first effect at the bottom of said VBME at the highest temperature and TDS;

wherein the second slip portion of the brine stream from said MSF train is supplied to the heating zone through the heating tubes of said last effect, and after partial heating by a flashing fraction of vapor in said last effect, is passed downward to the heating zone of each higher temperature effect in turn to gain heat proportional to the temperature rise between the effects, and is discharged as the parallel heated feed from the heating zone of said first effect at the bottom of said VBME at the highest temperature;

wherein steam from an external source is fed into the boiling tubes of said first effect, wherein is condensed inside the boiling tubes of said first effect by being used to evaporate vapor from an input feed outside the boiling tubes of said first effect, and is returned after condensation to said external source;

wherein the vapor produced in said first effect is supplied upward via an orifice into the boiling tubes of a second effect, wherein is condensed inside the boiling tubes of said second effect by being used to evaporate vapor from an input feed outside the boiling tubes of said second effect, and thereafter the vapor flow sequence, which is flowing vapor from a proceeding higher temperature and pressure effect as an input heat to a next succeeding lower temperature and pressure effect, is continued in series up the chain of said effects of said VBME train to said last effect, wherein the vapor produced from said last effect is condensed in said heat rejection condenser.

14. A method for desalinating or concentrating a feed stream, said method comprising a vertical backward fed multi-effect (VBME) train, which comprises:

a heat rejection condenser and a number of effects serially connected and vertically arranged, wherein each of said effects comprises a boiling zone, wherein said boiling zone comprises spray nozzles and boiling tubes; wherein a first effect, which is the highest temperature and pressure effect, is positioned at the bottom of said VBME train; wherein a last effect, which is the lowest temperature and pressure effect, is positioned at the top of said VBME train;

wherein said feed stream is supplied to the boiling zone through the spray nozzles and sprayed onto the boiling tubes of said last effect, and after partial evaporation in said last effect, is supplied downward by gravity as an input feed to the boiling zone of each higher temperature effect in turn, and is discharged as a brine stream from the boiling zone of said first effect at the bottom of said VBME at the highest temperature and total dissolved solids (TDS);

wherein steam from an external source is fed into the boiling tubes of said first effect, wherein is condensed inside the boiling tubes of said first effect by being used to evaporate vapor from an input feed outside the boiling tubes of said first effect, and is returned after condensation to said external source;

wherein the vapor produced in said first effect flows upward via an orifice into the boiling tubes of a second effect, wherein is condensed inside the boiling tubes of said second effect by being used to evaporate vapor from an input feed outside the boiling tubes of said second effect, and thereafter the vapor flow sequence, which is flowing vapor from a proceeding higher temperature and pressure effect as an input heat to a next succeeding lower temperature and pressure effect, is continued in series up the chain of said effects of said VBME train to said last effect, wherein the vapor produced from said last effect is condensed in said heat rejection condenser.

15. A method for de-scaling a feed stream to produce a de-scaled feed stream, said method comprising the steps of: (a) heating said feed stream to produce a heated feed stream; (b) mixing said heated feed stream with aluminum hydroxide or iron hydroxide, and then releasing the mixture in a flash stage, wherein the mixture is contacted with an organic hydroxide source, wherein said organic hydroxide source is sprayed via nozzles into said flash stage, thereby vigorously forming precipitates comprising magnesium sulfoaluminate or magnesium sulfoferrate, wherein said precipitates are removed from said flash stage to produce said de-scaled feed stream; and (c) simultaneously vigorously recovering said organic hydroxide source, wherein the recovered said organic hydroxide source is recycled to said flash stage.

16. The method of claim 15, wherein step (b) further comprises mixing dolime with said heated feed stream.

17. The method of claim 15, wherein said organic hydroxide source is selected from the group consisting of isopropylamine, propylamine, dipropylamine, diisopropylamine, ethylamine, diethylamine, methylamine, dimethylamine, ammonia, and combinations thereof.

18. The method of claim 15, further comprising the steps of: (a) decomposing said precipitates comprising said magnesium sulfoaluminate or said magnesium sulfoferrate by sulfuric acid, thereby separating magnesium sulfate from said aluminum hydroxide or said iron hydroxide; and (b) recycling the separated said aluminum hydroxide or said iron hydroxide for mixing with said heated feed stream.

19. The method of claim 15, further comprising the steps of: (a) mixing said feed stream with a second stream depleted of scale prone species to produce a mixed feed stream; (b) heating said mixed feed stream to produce a heated mixed feed stream; (c) mixing said heated mixed feed stream with said aluminum hydroxide or said iron hydroxide, and then releasing the mixture in said flash stage, wherein the mixture is contacted with said organic hydroxide source, wherein said organic hydroxide source is sprayed via said nozzles into said flash stage, thereby vigorously forming said precipitates comprising said magnesium sulfoaluminate or said magnesium sulfoferrate, wherein said precipitates are removed from said flash stage to produce said de-scaled feed stream; and (d) simultaneously vigorously recovering said organic hydroxide source, wherein the recovered said organic hydroxide source is recycled to said flash stage.

20. The method of claim 15, further comprising the steps of: (a) heating said feed stream to produce said heated feed stream; (b) mixing said heated feed stream with said aluminum hydroxide or said iron hydroxide, and then releasing the mixture in a first flash stage, wherein the mixture is contacted with said organic hydroxide source, wherein said organic hydroxide source is sprayed via nozzles into said first flash stage, thereby vigorously forming said precipitates comprising said magnesium sulfoaluminate or said magnesium sulfoferrate, wherein said precipitates are removed from said first flash stage to produce a first de-scaled feed stream; (c) simultaneously vigorously recovering said organic hydroxide source, wherein the recovered said organic hydroxide source is recycled to said first flash stage; (d) heating a second stream, wherein said second stream is depleted of scale prone species, to produce a heated second stream; (e) releasing said heated second stream in a second flash stage to be flashed and mixed with said first de-scaled stream from said first flash stage, thereby producing said de-scaled feed stream and a vapor stream containing trace amounts of said organic hydroxide source; and (f) recycling said vapor stream containing trace amounts of said organic hydroxide source to said first flash stage.

* * * * *